United States Patent
Awasthi et al.

(10) Patent No.: US 12,507,938 B2
(45) Date of Patent: Dec. 30, 2025

(54) SYSTEMS AND METHODS FOR TRACKING CARDIAC VALUES

(71) Applicant: Anumana, Inc., Cambridge, MA (US)

(72) Inventors: Samir Awasthi, Boston, MA (US); Rakesh Barve, Bengaluru (IN); Shahir Asfahan, Bengaluru (IN); Shashi Kant, Bengaluru (IN)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 18/750,336

(22) Filed: Jun. 21, 2024

(65) Prior Publication Data

US 2025/0387064 A1    Dec. 25, 2025

(51) Int. Cl.
*A61B 5/346*   (2021.01)
*A61B 5/00*    (2006.01)
*A61B 5/02*    (2006.01)

(52) U.S. Cl.
CPC .......... *A61B 5/346* (2021.01); *A61B 5/02028* (2013.01); *A61B 5/7267* (2013.01); *A61B 5/742* (2013.01)

(58) Field of Classification Search
CPC ..... A61B 5/346; A61B 5/02028; A61B 5/742; A61B 5/7264–7267
See application file for complete search history.

(56) References Cited

U.S. PATENT DOCUMENTS

| | | | |
|---|---|---|---|
| 11,696,717 B2 * | 7/2023 | Niebauer | A61B 5/25 |
| 2011/0224565 A1 * | 9/2011 | Ong | A61B 5/4824 600/509 |
| 2019/0104949 A1 * | 4/2019 | Cadieu | G16H 30/40 |
| 2020/0138321 A1 * | 5/2020 | Niebauer | A61B 5/25 |
| 2020/0397313 A1 * | 12/2020 | Attia | A61B 5/318 |
| 2021/0275047 A1 * | 9/2021 | Pinkovich | A61B 8/0883 |
| 2021/0398676 A1 * | 12/2021 | Evans | G16H 15/00 |
| 2022/0384045 A1 * | 12/2022 | Zimmerman | A61B 5/0006 |
| 2022/0384046 A1 * | 12/2022 | Saliman | G16H 10/60 |
| 2023/0395248 A1 * | 12/2023 | Sipe | G16H 50/20 |
| 2024/0062905 A1 * | 2/2024 | Wagner | A61B 5/36 |

(Continued)

FOREIGN PATENT DOCUMENTS

| | | |
|---|---|---|
| DE | 102020209696 A1 | 2/2022 |
| WO | 2007136614 A1 | 11/2007 |
| WO | 2022241264 A3 | 1/2023 |

*Primary Examiner* — Eric D. Bertram
(74) *Attorney, Agent, or Firm* — Caldwell Intellectual Property Law

(57) ABSTRACT

A system for tracking cardiac values including at least a processor configured to receive electrocardiogram (ECG) input data associated with a patient wherein the ECG input data includes ECG signals, input the ECG input data into one or more cardiac panels, wherein each cardiac panel of the one or more cardiac panels is configured to calculate a cardiac value associated with a heart condition and each cardiac panel comprises at least one ECG machine-learning model configured to receive ECG input data and output cardiac values, generate the cardiac values from the cardiac panels as a function of the ECG input data wherein at least one cardiac value of the one or more cardiac values includes a probability of the patient satisfying at least one ejection fraction level threshold and the one or more ECG machine-learning models and display the cardiac values through a graphical user interface.

18 Claims, 9 Drawing Sheets

(56) References Cited

U.S. PATENT DOCUMENTS

2024/0164688 A1\* 5/2024 Asirvatham ........... G06N 3/088
2024/0249498 A1\* 7/2024 Galeotti ................. G16H 50/70
2024/0321455 A1\* 9/2024 Hytopoulos ........... G16H 50/30
2025/0000371 A1\* 1/2025 Attia ....................... G06N 3/04

\* cited by examiner

SYSTEMS AND METHODS FOR TRACKING CARDIAC VALUES

FIELD OF THE INVENTION

The present invention generally relates to the field of machine learning models. In particular, the present invention is directed to systems and methods of tracking cardiac values.

BACKGROUND

Current systems used to track cardiac values require differing inputs to generate differing outputs. These systems are inefficient and require extensive human interaction and supervision. In addition, current systems that may receive a singular input in order to output information associated with differing diagnosis are inaccurate and prone to error.

SUMMARY OF THE DISCLOSURE

In an aspect, a system for tracking cardiac values is described. The system includes at least a processor and a memory communicatively connected to the at least a processor. The memory contains instructions configurating the at least a processor to receive electrocardiogram (ECG) input data associated with a patient wherein the ECG input data includes a plurality of ECG signals, input the ECG input data into one or more cardiac panels, wherein each cardiac panel of the one or more cardiac panels is configured to calculate a cardiac value associated with a heart condition and each cardiac panel includes at least one ECG machine learning model configured to receive ECG input data as inputs and output cardiac values, generate the one or more cardiac values from the one or more cardiac panels as a function of the ECG input data and the one or more ECG machine learning models wherein at least one cardiac value of the one or more cardiac values includes a probability of the patient satisfying at least one ejection fraction level threshold and display the one or more cardiac values through a graphical user interface.

In another aspect, a method for tracking cardiac values is described. The method includes receiving, by at least a processor, electrocardiogram (ECG) input data associated with a patient wherein the ECG input data includes a plurality of ECG signals, inputting, by the at least a processor, the ECG input data into one or more cardiac panels, wherein each cardiac panel of the one or more cardiac panels is configured to calculate a cardiac value associated with a heart condition and each cardiac panel includes at least one ECG machine learning model configured to receive ECG input data as inputs and output cardiac values, generating, by the at least a processor, the one or more cardiac values from each cardiac panel as a function of the ECG input data and the one or more ECG machine learning models wherein at least one cardiac value of the one or more cardiac values includes a probability of the patient satisfying at least one ejection fraction level threshold and displaying, by the at least a processor, the one or more cardiac values through a graphical user interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Deep learning based methods have been used to analyze the (Electrocardiogram) ECG signals, however, oftentimes such methods are trained from scratch for a particular problem (e.g. disease classification from the ECGs). This paradigm is limited by the amount of "labeled" data one has (in this context, labeled data would correspond to having both the ECG signal and the corresponding disease labels). Such labeling or annotation efforts may not always be feasible on a large scale. In contrast, "self-supervised learning (SSL)" paradigm firsts learns to extract the meaningful general-purpose representation of the data points using a large amount of "unlabeled" data, and then fine-tune it for a particular use case (e.g. disease classification) using limited amounts of "labeled" data. While such methods have been extensively designed and studied for modalities such as images and text, there is not much literature on such SSL techniques designed for signals, such as ECGs. Some of the recent works leverage existing SSL techniques by plotting ECGs as images and applying the image-based SSL model. But this is highly inefficient as images would need much larger memory footprint and neural networks, whereas the ECG signal itself is low dimensional.

In an embodiment, systems and methods described herein may allow for the use of machine learning models to receive Electrocardiogram signals as input and output abnormalities associated with a patient's heart. In an embodiment, machine learning models may be pretrained on similar sets of training data and trained on differing sets of training data. In an embodiments, each machine learning model may be configured to receive the same input, yet output information associated with differing heart conditions.

Figure 1:
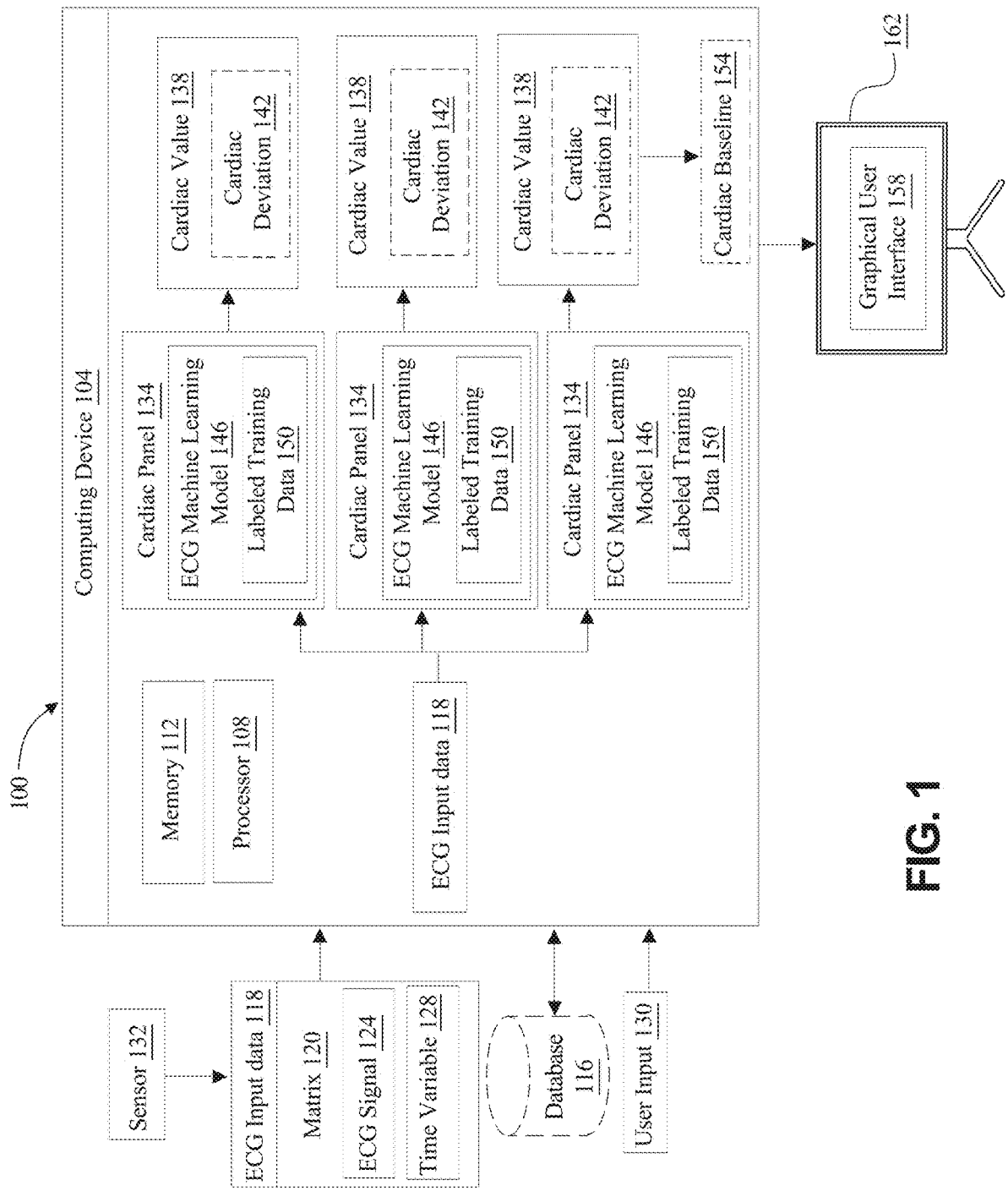
FIG. 1 is a system for tracking cardiac values in accordance with the subject disclosure.

Referring now to FIG. 1, a system 100 for tracking cardiac values is described. System 100 includes a computing device 104. System 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device 104. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiments, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register may be configured to synchronize the processor with other computing components. In one or more embodiments, processor 108 may include more than one processing unit having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU may be configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, System 100 may include a database 116. Database may include a remote database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device 104. In one or more embodiments, computing device 104 may transmit processes to server wherein computing device 104 may conserve power or energy.

With continued reference to FIG. 1, processor 108 is configured to receive Electrocardiogram (ECG) input data 118. "Electrocardiogram input data" as described in this disclosure is information associated with electrocardiogram signals received from an individual. For example, and without limitation, ECG input data 118 may include electrocardiogram signals received from one or more leads. In one or more embodiments, ECG input data 118 may include a matrix 120 having a plurality of electrocardiogram signals 124 and/or associated time variables 128. A "matrix" for the purposes of this disclosure is an array of numbers or characters arranged in rows or columns which are used to represent an object or properties of the object. For example, and without limitation, a matrix may be used to describe linear equations, differential equations, in a two-dimensional format. In another non limiting example, a matrix may be used to create graphs based on data points, generate statistical models and the like. In one or more embodiments, matrix 120 may include a plurality of electrocardiogram signals associated with a plurality of time variables 128. As used in the current disclosure, a "electrocardiogram signal" is a signal representative of electrical activity of heart. The ECG signal 124 may consist of several distinct waves and intervals, each representing a different phase of the cardiac cycle. These waves may include the P-wave, QRS complex, T wave, U wave, and the like. The P-wave may represent atrial depolarization (contraction) as the electrical impulse spreads through the atria. The QRS complex may represent ventricular depolarization (contraction) as the electrical impulse spreads through the ventricles. The QRS complex may include three waves: Q wave, R wave, and S wave. The T-wave may represent ventricular repolarization (recovery) as the ventricles prepare for the next contraction. The U-wave may sometimes be present after the T wave, it represents repolarization of the Purkinje fibers. The intervals between these waves may provide information about the duration and regularity of various phases of the cardiac cycle. The ECG signal 124 may help diagnose various heart conditions, such as arrhythmias, myocardial infarction (heart attack), conduction abnormalities, and electrolyte imbalances. In one or more embodiments, ECG signals 124 may be received by one or more electrodes connected to the skin of an individual. In one or more embodiments, ECG signals 124 may represent depolarization and repolarization occurring in the heart. In one or more embodiments, ECG signals 124 may be captured periodically. For example, and without limitation, every second, every millisecond and the like. In one or more embodiments, each ECG signal 124 may contain an associated time variable 128. "Time variable" for the purposes of this disclosure is information indicating the time at which a particular ECG signal 124 was received. For example, and without limitation, time variable 128 may include, 5 ms, 10 ms, 15 ms and the like. In one or more embodiments, each ECG signal 124 may contain a time variable 128. In one or more embodiments, time variable 128 may increase in given increments, such as for example, in increments of 5 ms, wherein a first time variable 128 may include 5 ms and a second time variable 128 may include 10 ms. In one or more embodiments, a combination of a plurality of ECG signals 124 and correlated time variable 128 may be used to generate a graph illustrating the heart functions of an individual. In one or more embodiments, matrix 120 may include a plurality of ECG signals 124 and correlated time variable 128 during a given time frame such as, for example, over the span of a second, a minute, an hour, and the like. In one or more embodiments, ECG signals 124 may be captured as voltages, such as millivolts or microvolts.

With continued reference to FIG. 1, the plurality of electrocardiogram signals may capture a temporal view of cardiac electrical activities. A "temporal view," as used in the current disclosure, refers to the analysis and visualization of heart-related events and phenomena over time. A temporal view may include patterns, changes, and dynamics of cardiac activity over time. A temporal view may include information surrounding the rhythm of the heart, including the regularity or irregularity of heartbeats. It allows for the identification of various rhythm abnormalities such as tachycardia (fast heart rate), bradycardia (slow heart rate), or arrhythmias (irregular heart rhythms). A temporal view of cardiac activities in three dimensions may refer to a visualization that represents the temporal evolution of cardiac events or phenomena in a three-dimensional space. It provides a comprehensive understanding of how various cardiac activities change over time. The ECG signal 124 may move through the 3D space of the heart over time. The signal does not just move forward in time, it also moves through the physical space of the heart, from SA node through atria, to AV node, and then through the ventricles. Such movement of the electrical signal through the heart's physical space over time can be referred to as "spatiotemporal excitation and propagation" which could be captured by plurality of ECG signals 124. It is essentially a way of observing and analyzing the timing and sequence of the heart's electrical activity as it moves through the physical structure of the heart. In the current case the dimensions may include axis representing time, spatial dimensions, and cardiac activity. By combining the temporal, spatial, and cardiac activity dimensions, the temporal view of cardiac activities in three dimensions allows for a comprehensive visualization and analysis of dynamic changes occurring within the heart. It can be used to study phenomena like electrical conduction, ventricular wall motion, valve function, blood flow dynamics, or the interaction between different regions of the heart. This visualization approach provides valuable insights into the complex temporal dynamics of cardiac activities and aids in understanding cardiac function, pathology, and treatment evaluation.

With continued reference to FIG. 1, matrix 120 and/or ECG signals 124 may be received through one or more input devices. "Input device" for the purposes of this disclosure is a device capable of transmitting information to computing device. For example, and without limitation, input device 130 may include a keyboard, a mouse, a touchscreen, a smartphone, a network server, a sensor 132 and the like. In one or more embodiments, input device 130 may include a sensor 132. In one or more embodiments, matrix 120 and/or ECG signals 124 may be received by input device 130 and/or sensor 132. As used in this disclosure, a "sensor" is a device that may be configured to detect an input and/or a phenomenon and transmit information related to the detection. Sensor 132 may detect a plurality of data. A plurality of data detected by sensor 132 may include, but is not limited to, electrocardiogram signals, heart rate, blood pressure, electrical signals related to the heart, time variables 128 associated with captured data and the like. In one or more embodiments, and without limitation, sensor 132 may include a plurality of sensors 132. In one or more embodiments, and without limitation, sensor 132 may include one or more electrodes, and the like. Electrodes used for an electrocardiogram (ECG) are small sensors 132 or conductive patches that are placed on specific locations on the body to detect and record the electrical signals generated by the heart. Senor may serve as the interface between the body and the ECG machine, allowing for the measurement and recording of the heart's electrical activity. A plurality of sensors 132 may include 10 electrodes used for a standard 12-lead ECG, placed in specific positions on the chest and limbs of the patient. These electrodes are typically made of a conductive material, such as metal or carbon, and are connected to lead wires that transmit the electrical signals to the ECG machine for recording. In one or more embodiments, plurality of ECG signals 124 may be associated with a 12-lead electrocardiogram. Proper electrode placement is crucial to ensure accurate signal detection and recording. In one or more embodiments, sensors 132 may include wireless sensors 132 wherein data may be received from sensor 132 to computing device wirelessly. In one or more embodiments, wireless sensors 132 may include Bluetooth enabled ECG sensors, RFID ECG sensors, Wi-Fi enabled ECG sensors and the like. In one or more embodiments, wireless sensors 132 may allow for receipt of data from a distance. In one or more embodiments, wireless sensors 132 may allow for a machine or system to receive data without wires connecting the sensors 132 to computing device. In one or more embodiments, the presence of wires from sensors 132 to computing device may obstruct medical personnel from conducting one or more medical treatment procedures.

With continued reference to FIG. 1, the plurality of sensors 132 may be placed on each limb, wherein there may be at least one sensor on each arm and leg. These sensors may be labeled I, II, III, V1, V2, V3, V4, V5, V6, and the like. For example, Sensor I may be placed on the left arm, Sensor II may be placed on the right arm, and Sensor III may be placed on the left leg. Additionally, a plurality of sensors may be placed on various portions of the patient's torso and chest. For example, a sensor V1 may be placed in the fourth intercostal space at both the right sternal borders and sensor V2 may be fourth intercostal space at both the left sternal borders. A sensor V3 may also be placed between sensors V2 and V4, halfway between their positions. Sensor V4 may be placed in the fifth intercostal space at the midclavicular line. Sensor V5 may be placed horizontally at the same level as sensor V4 but in the anterior axillary line. Sensor V6 may be placed horizontally at the same level as V4 and V5 but in the midaxillary line. In one or more embodiments, each sensor and/or lead may contain a set of electrical signals, wherein matrix 120 may include ECG signals 124 associated with each lead and/or sensor.

With continued reference to FIG. 1, the plurality of sensors 132 may include augmented unipolar sensors. These sensors may be labeled as aVR, aVL, and aVF. These sensors may be derived from the limb sensors and provide additional information about the heart's electrical activity. These leads are calculated using specific combinations of the limb leads and help assess the electrical vectors in different orientations. For example, aVR may be derived from Sensor II and Sensor III. In another example, aVL may be derived from sensor I and Sensor III. Additionally, aVF may be derived from Lead I and Lead II. The combination of limb sensors, precordial sensors, and augmented unipolar sensors allows for a comprehensive assessment of the heart's electrical activity in three dimensions. These leads capture the electrical signals from different orientations, which are then transformed into transformed coordinates to generate vectorcardiogram (VCG) representing magnitude and direction of electrical vectors during cardiac depolarization and repolarization. Transformed coordinates may include one or more a Cartesian coordinate system (x, y, z), polar coordinate system (r, $\theta$), cylindrical coordinate system ($\rho$, $\varphi$, z), or spherical coordinate system (r, $\theta$, $\varphi$). In some cases, transformed coordinates may include an angle, such as with polar coordinates, cylindrical coordinates, and spherical coordinates. In some cases, VCG may be normalized thus permitting full representation with only angles, i.e., angle traversals. In some cases, angle traversals may be advantageously processed with one or more processes, such as those described below and/or spectral analysis.

With continued reference to FIG. 1, in one or more embodiments, sensor 132 may include surface electrodes wherein the surface electrodes may be placed above the skin of a user and used to detect electrical impulses. In one or more embodiments, sensor 132 may further include a wearable ECG monitor wherein the wearable ECG monitor may be wrapped around a limb of the individual and used to detect electrical impulses. In one or more embodiments, sensor 132 may further include a Holter monitor, subdermal needle electrodes, and/or any other sensing device capable of receiving electrical signals.

With continued reference to FIG. 1, matrix 120 may include a plurality of ECG signals 124 captured at discrete time intervals. In one or more embodiments, matrix 120 may be generated and/or received in a digital imaging and communications in medicine (DICOM) Format, a CSV format, as a spread sheet containing cells for each datum and the like. In one or more embodiments, computing device may receive data in a raw format wherein the data may be converted into a matrix.

With continued reference to FIG. 1, ECG signals 124 received from each sensor 132 may be referred to as an 'ECG set.' In one or more embodiments, an ECG set may include ECG signals 124 captured from a singular sensor 132 over a given period of time. In one or more embodiments, ECG input data 118 may include a plurality of ECG sets wherein each ECG set may correspond to a differing input device differing sensor 132 and the like in contact with an individual. In one or more embodiments, each ECG set may correspond to a different surface electrode in contact with an individual. In one or more embodiments, ECG input data 118 may include ECG sets wherein ECG sets include similar timeframes in which ECG signals 124 are captured. For example, and without limitation, an 8-lead system 100 may include 8 ECG sets wherein each ECG set corresponds to a particular lead.

With continued reference to FIG. 1, processor 108 may be configured to receive ECG input data 118 in textual format. A "Textual format" for the purposes of this disclosure is a format in which a set of data is represented by characters, numbers or any other alphanumeric representations. For example, and without limitation, a set of data may be said to be in textual format in instances in which the contents of the file contain only characters of readable material. In one or more embodiments, data in textual format may be contrasted with an image, video and the like. In one or more embodiments, data within a textual format may include machine-readable alphanumeric characters. In one or more embodiments, data within a textual format may include data such as .txt, .docx, .xlsx and the like. In one or more embodiments, ECG input data 118 may be received in textual format wherein ECG input data 118 may include textual data corresponding to Leads and corresponding voltage signals of the leads.

In one or more embodiments, ECG input data 118 may include matrix 120 and/or an array of data wherein matrix 120 may include matrix 120 of size N×T, where N is the number of leads in the ECG and T is the number of voltage signals recorded in that ECG. In one or more embodiments, 'T' will depend on the frequency of the acquired ECG input data 118 (referred to herein as 'f') and the length of the signal in seconds (referred to herein as 'S'), i.e., T=f*S. In one or more embodiments, matrix 120 may include a two dimensional array having size of N×T wherein N may denote the number and/or particular leads and T may denote the voltage signals. In one or more embodiments, ECG input data 118 may be received in a 3-dimensional array of N×T×S wherein s may denote the seconds and/or time corresponding to each voltage signal. In one or more embodiments, ECG input data 118 may include a matrix 120 having one or more leads and voltage signals associated with each of the one or more leads. In an embodiment, each lead may be configured to receive voltage signals from a patient wherein ECG input data 118 may include voltage signals from each lead on the patient. In one or more embodiments, leads may include any leads as described above. In one or more embodiments, each ECG input data 118 may include data received from multiple leads in contact with a patient. In one or more embodiments, processor 108 may be configured to receive ECG input data 118 wherein ECG input data 118 is associated with a particular individual and/or medical patient. In one or more embodiments, ECG input data 118 may contain voltage signals over a given period of time and/or ECG signals 124. In one or more embodiments, each voltage signal within ECG input data 118 may contain corresponding time variable 128 (as described above) wherein time variable 128 denotes the time at which the particular voltage signal was received. In an embodiment, matrix 120 may include an array for each lead wherein the array contains voltage signals and time variables 128 associated with the voltage signals. In one or more embodiments, sensors 132 associated with each lead may be configured to receive voltage signals and corresponding time variables 128. In one or more embodiments, ECG input data 118 may be received from a plurality of patients, from a database 116, from a web using a web crawler and the like. In one or more embodiments, each set of ECG input data 118 may correspond to a particular individual and/or patient. In one or more embodiments, ECG input data 118 may contain ECG signals 124 received from each sensor 132 of a plurality of sensors 132 that were in contact with a patient. In one or more embodiments, the sensors 132 may be configured to receive ECG signals 124 and associated time variables 128 denoting the time at which the ECG signal 124 was received. In one or more embodiments, ECG signals 124 may be received from an 8 or lead ECG wherein each lead includes a sensor 132 configured to receive ECG signals 124 from a particular portion of an individual's body. In one or more embodiments, in instances in which a different number of leads, for example, plurality of sensors are 12 leads and system may be only compatible with processing 6 leads, processor 108 may be configured to convert 12 to 6 leads by employing methods described in U.S. nonprovisional application Ser. No. 18/648,250, filed on Apr. 26, 2024, entitled "APPARATUS AND METHOD OF TRAINING A MACHINE-LEARNING MODEL TO GENERATE DETERMINATIONS USING MISMATCHED-CHANNEL SIGNALS" the entirety of which is incorporated herein by reference. In one or more embodiments, ECG input data 118 may contain ECG signals 124 from multiple electrodes recorded over a similar time frame. For example, and without limitation, ECG input data 118 may include ECG signals 124 received from multiple electrodes over a similar timeframe of 0 to 10 seconds. In one or more embodiments, matrix 120 may include a 2-dimensional array as shown as a non-illustrative example below.

With continued reference to FIG. 1, processor 108 is configured to input the ECG input data 118 into one or more cardiac panels 134. A "cardiac panel" for the purposes of this disclosure is a set of algorithms or machine learning models that are used to evaluate and monitor a patient's medical condition. For example, and without limitation, cardiac panel 134 may include a set of algorithms configured to receive electrocardiogram signals and an ejection fraction associated with the individual. In one or more embodiments, each cardiac panel 134 may be configured to provide a comprehensive view of a patient's journey through a disease. For example, and without limitation, cardiac panels 134 may include algorithms configured to receive ECG signals and output information associated with heart conditions such as but not limited to ejection fraction (EF), hyperkalemia, diastolic dysfunction and the like. In one or more embodiments, algorithms may include machine learning models, linear regression models and/or any other mathematical models configured to receive a variable such as ECG input data 118 and output a medical condition and/or information that may be indicative of a medical condition. In one or more embodiments, each cardiac panel 134 may contain a distinct set of algorithms configured to monitor and/or generate a patient's health in association to a particular disease. For example, and without limitation, a first cardiac panel 134 may be used to monitor ejection fraction of a patient wherein the first cardiac panel 134 may output the percentage of blood leaving the heart whereas a second cardiac panel 134 may be used to monitor a degree of heart arrythmia associated with the patient. In one or more embodiments, each cardiac panel 134 may be used to monitor and/or determine a particular heart disease associated with patient such as but not limited to, arrythmias, tachycardia, bradycardia, heart attacks, coronary heart disease and the like. In one or more embodiments, each cardiac panel 134 may be configured to receive the same or similar inputs and output differing results. In one or more embodiments, each cardiac panel 134 may receive ECG input data 118 and output a differing heart disease or heart condition.

With continued reference to FIG. 1, cardiac panel 134 is configured to identify or calculate a cardiac value 138. A "cardiac value" for the purposes of this disclosure is information associated with a heart disease or heart condition. For example, and without limitation, cardiac value 138 may include information associated with ejection fraction, such as 50%. In one or more embodiments, cardiac value 138 may be used to determine a level or value associated with a particular heart condition. For example, and without limitation, cardiac value 138 may include an ejection fraction level. In another non limiting example, cardiac value 128 may be used to determine how well a heart is functioning as a numerical value. In one or more embodiments, cardiac value may include a level of probability associated with a heart condition, wherein the level of probability may indicate the probability that the patient has the condition and/or the probability the patient will have the condition. In one or more embodiments, cardiac value 138 may include, but is not limited to, values used to indicate a level of atrial fibrillation, tachycardia, premature beats, bradycardia, heart block, heart palpitations and the like. In one or more embodiments, cardiac value 138 may include one or more values typically detected using an echocardiogram; this may include, as non-limiting examples, ejection fraction, wall thickness, wall motion, flow velocities, valve areas, strain, isovolumic relaxation time, end diastolic diameter, end systolic diameter, posterior wall thickness, left ventricular mass index, left atrial volume, end-diastolic volume, end-systolic volume, fractional shortening, right atrial volume index, basal RV diameter, global longitudinal strain, right ventricular systolic pressure, E/A ratio, and the like. In one or more embodiments, cardiac value 138 may include one or more hemodynamic values. Hemodynamic values may include, as non-limiting examples, pressure wave forms, flow velocities, mean arterial pressure, CVP, PAP, Mean PA pressure, cardiac output, cardiac index, pulmonary vascular resistance, systemic vascular resistance, right ventricular stoke work, left ventricular stroke work, and the like. In one or more embodiments, cardiac value 138 may include on or more values typically detected using a Doppler echocardiogram. In one or more embodiments, cardiac value 138 may include NT-proBNP values. In one or more embodiments, each cardiac panel 134 may be configured to output a differing cardiac value 138. In one or more embodiments, cardiac values may include the severity of the disease or condition. In one or more embodiments, the severity may be rated on a scale of 0 to 100 wherein a 0 may indicate that that there is no severity and 100 may indicate that the condition is quite severe. In one or more embodiments, cardiac values 138 may include numerical amounts associated with each condition wherein the numerical amount may indicate the severity of the condition and/or numerical amounts that can be compared to reference ranges in order to determine the severity of the condition. In one or more embodiments, cardiac values 138 may include vector loops indicating electrical signals within the heart, wherein vector loops may be used to determine the severity of the condition. In one or more embodiments, cardiac values may include P waves and QRS complexes which may be used to determine the severity of a condition.

With continued reference to FIG. 1, cardiac value 138 may include an ejection fraction level of the patient. In one or more embodiments, an ejection fraction level may include a measurement of a percentage of blood that the left ventricle of the heart pumps out. In one or more embodiments, ejection fraction levels may indicate the hearts ability to pump blood throughout the body. In one or more embodiments, an ejection fraction level of above 50% may indicate that the patient has normal heart function. In one or more embodiments, an ejection fraction level of between 45% and 50% may indicate that the patient has peripartum cardio myopathy. In one or more embodiments, an ejection fraction level of 45% indicates the threshold for drug induced cardio myopathy. In one or more embodiments, an ejection fraction level of below 40% may indicate severe heart failure. In one or more embodiments, a determined ejection fraction level can be used to determine if patient needs left ventricular assist device (LVAT) prior to heart failure occurring. In one or more embodiments, cardiac value 138 may include an ejection fraction level of the patient. In one or more embodiments, cardiac value 138 may include changes in the ejection fraction level. In one or more embodiments, shape of an ECG waveform may be influenced by a number of factors. For example and without limitation, subtle deformations may be imparted on one or more portions of the ECG waveform for a subject who has low or very low ejection fraction as compared to another subject who has normal ejection fraction. The underlying disease affecting the heart, whether due to atherosclerosis, myopathic processes, inflammation, valvular derangements from any cause, can impair the heart muscle's pumping capability. The underlying disease may similarly affect the metabolism of individual myocytes or their interconnections, and lead to deposition of fibrosis or infiltration of inflammatory cells, all of which lead to subtle electrical changes. These local cardiac electrical changes may contribute to deformations recorded on the surface ECG and/or within ECG input data 118. Such deformations may not be visible with the naked, buteye but may nonetheless be detectable using computer-based models according to the techniques disclosed herein.

With continued reference to FIG. 1, at least one cardiac value 138 may include a probability of a patient satisfying at least one ejection fraction level threshold. An "Ejection fraction level threshold" for the purposes of this disclosure refers to a range of ejection fraction level values. For example and without limitation, ejection fraction level threshold may include a range of ejection fraction levels ranging from 40% to 50%. In one or more embodiments, ejection fraction level threshold may include a range of ejection fraction levels. In one or more embodiments, a patient may satisfy an ejection fraction level threshold by having an ejection fraction level within a range of the ejection fraction level threshold. For example, and without limitation, a patient may satisfy an ejection fraction level threshold of between 45% and 50% in instances in which the patient has an ejection fraction level of 47%. In one or more embodiments, falling within a particular ejection fraction level threshold may indicate an underlying heart disease. For example, and without limitation, a patient satisfying an ejection fraction level threshold of between 50 and 70% may indicate that the patient has normal heart function. In one or more embodiments, one or more ejection fraction level thresholds may exist wherein each ejection fraction level threshold is associated with an underlying heart function. In one or more embodiments, a first ejection fraction level threshold may include a range of ejection fraction levels from between 50% and 70% wherein a range of 50 to 70% may indicate that the patient is healthy. In one or more embodiments, a second ejection fraction level threshold may include a range of ejection fraction levels from between 45% and 49% may indicate a mild impairment in heart function, yet still close to normal heart function. In one or more embodiments, a third ejection fraction level threshold may include a range of ejection fraction levels from between 40 and 45% wherein the third ejection fraction level threshold may indicate a mild impairment in heart function and early signs of heart impairment. In one or more embodiments, a fourth ejection fraction level threshold may include a range of ejection fraction levels from between 35% and 39% wherein the fourth ejection fraction level threshold may a patient is approaching sever dysfunction but still moderately reduced heart function. In one or more embodiments, a fifth ejection fraction level threshold may include a range between 30% and 34% wherein the fifth ejection fraction level threshold may include moderation reduction in ejection fraction levels and possible significant impairment in heart function. In one or more embodiments, a sixth ejection fraction level threshold may include a range of ejection fraction levels below 30% wherein the sixth ejection fraction level threshold may indicate severe impartment in heart function and advanced heart failure. In one or more embodiments, a patient may be said to satisfy an ejection fraction level threshold if they fall within a range of ejection fraction levels within the range provided by the ejection fraction level threshold. In one or more embodiments, each cardiac panel 134 may be configured to calculate a cardiac value 138 for each ejection fraction level threshold. For example, and without limitation, a first cardiac panel may be configured to determine a first cardiac value associated with a first ejection fraction level threshold and a second cardiac panel may be used to determine a second cardiac value associated with a second ejection fraction level threshold. In an embodiment, each cardiac panel may be configured to output a given probability that that patient falls within a range of ejection fraction level values.

With continued reference to FIG. 1, cardiac value 138 may include a probability that the patient satisfies a particular ejection fraction level threshold. For example, and without limitation cardiac value may include '80%' wherein '80%' my indicate that there is an 80% probability that the patient's ejection fraction level falls within the range provided by ejection fraction level threshold. Continuing the 80% for an ejection fraction level threshold of between 35% and 40% may indicate that there is an 80% probability that the patient has an ejection fraction level ranging from 35 and 40%. In one or more embodiments, it may not be necessary to know the actual ejection fraction level, but rather the probability that the patient's ejection fraction level falls within a range of value. In an embodiments, ECG signals used to determine ejection fraction levels may produce more accurate results in instances in which a probability is given of a particular range. In one or more embodiments, ejection fraction level thresholds may include maximum values rather than ranges/For example, and without limitation, the first ejection fraction level threshold may include a maximum value of 70% wherein a patient having any ejection fraction level under 70% may fall within first ejection fraction level threshold. Continuing, the second ejection fraction level threshold may include a maximum value of 49% wherein a patient with an ejection fraction level of below 49% may satisfy the second ejection fraction level threshold and the first ejection fraction level threshold. In one or more embodiments, in the exemplary embodiment described above, a patient may satisfy multiple ejection fraction level thresholds. For example, and without limitation, a patient with an ejection fraction level of 37% may satisfy the first through fourth ejection fraction level thresholds. In one or more embodiments, cardiac value may include a probability that a patient satisfies each ejection fraction level threshold. In one or more embodiments, each cardiac panel may be used to With continued reference to FIG. 1, the ejection-fraction level may include an absolute estimate of the patient's ejection fraction that identifies a specific value for the ejection fraction. In other implementations, the ejection-fraction level may include a category or range of ejection-fraction values (e.g., very low ejection fraction, low ejection fraction, or normal ejection fraction). For example, a machine learning model such as ECG Machine learning model may be trained to classify a patient's ejection fraction into one of two, three, or more possible ejection-fraction categories defined by specified threshold ejection-fraction values. A binary classification model may classify a patient's ejection fraction into two possible categories. The system may then store and/or outputs the estimated ejection-fraction level, e.g., for presentation to the patient or his or her healthcare provider. In one or more embodiments, cardiac value 138 may include an ejection fraction characteristic as described in U.S. nonprovisional application Ser. No. 16/754,007, filed on Apr. 6, 2020, and entitled "ECG-BASED CARDIAC EJECTION-FRACTION SCREENING" and further in U.S. nonprovisional application Ser. No. 18/517,640, filed on Dec. 22, 2023, and entitled "SYSTEM AND APPARATUS FOR GENERATING IMAGING INFORMATION BASED ON AT LEAST A SIGNAL" and further in U.S. nonprovisional application Ser. No. 17/552,246, filed on Dec. 15, 2021, and entitled "SYSTEMS AND METHODS FOR DIAGNOSING A HEALTH CONDITION BASED ON PATIENT TIME SERIES DATA" and further in application Ser. No. 18/666,363, filed on May 16, 2024, and entitled "APPARATUS AND METHOD FOR LEFT VENTRICULAR EJECTION FRACTION PREDICTION" in the entirety of which are all incorporated herein by reference. In one or more embodiments, cardiac panel 134 may include any processes, steps and/or machine learning models used to calculate an ejection fraction characteristic as indicated in the above reference.

With continued reference to FIG. 1, cardiac panel 134 may utilize one or more algorithms in order to generate cardiac values. In one or more embodiments, cardiac values may include diagnostic data as described in U.S. nonprovisional application Ser. No. 18/395,399, filed on Dec. 22, 2023, and entitled "METHODS AND APPARATUSES FOR SYNTHESIZING TIME SERIES DATA AND DIAGNOSTIC DATA" the entirety of which is incorporated herein by reference. In one or more embodiments, cardiac panel 134 may include any processes, steps and/or machine learning models used to calculate and/or determine diagnostic data as indicated in the above reference.

With continued reference to FIG. 1, each cardiac panel 134 may be configured to generate a differing cardiac value 138. In one or more embodiments, each cardiac panel 134 may contain a separate and/or differing machine learning model configured to receive ECG input data 118 and output cardiac value 138. In one or more embodiments, cardiac panel 134 may use an ECG machine learning model 146 to receive ECG input data 118 and output cardiac values. In one or more embodiments, ECG machine learning model 146 within each cardiac panel 134 may be configured to receive ECG input data 118 as inputs and output cardiac values 138. In one or more embodiments, ECG machine learning model 146 may include ECG machine learning model 146 as described in reference to at least FIG. 2. In one or more embodiments, ECG machine learning model 146 may be configured to receive multiple sets of ECG input data 118 wherein each set of ECG input data 118 may correspond to ECG input data 118 received at a differing, hour, data, iteration of the processing of system 100 and the like. In one or more embodiment, cardiac panel 134 may be configured output changes in cardiac values as a function of the multiple sets of ECG input data 118. In one or more embodiments, cardiac panel 134 may output a change in a cardiac value 138 in comparison to a current iterations of the processing and a previous iteration of the processing. For example, and without limitation, cardiac panel 134 may indicate how a particular cardiac value 138 has improved or continued to decline over a given period of time. In one or more embodiments, processor 108 may be configured to receive ECG input data 118 periodically, wherein each set of ECG input data 118 may be stored on database 116. In one or more embodiments, processor 108 may receive multiple sets of ECG input data 118 from previous iterations and compare them to current ECG input data 118. In one or more embodiments, cardiac panel 134 may contain changes in cardiac values from a current iterations in comparison to a previous iteration.

With continued reference to FIG. 1, on one or more embodiments, cardiac panel 134 may be configured to output a cardiac deviation 142. A "Cardiac deviation" for the purposes of this disclosure is a change in a cardiac value 138. For example and without limitation, cardiac deviation 142 may indicate that a patients risk of heart attack has increased 15% (e.g., from 20% to 35%). In another non limiting example, cardiac deviation 142 may indicate a change in ejection fraction wherein cardiac deviation 142 may indicate that ejection fraction of the patient has increased from 40% to 50%. In one or more embodiments, ejection fraction levels may indicate the percentage of blood that the heart is pumping out of the left ventricle for each contraction in comparison to the total amount of blood within the ventricle. For example, an ejection fraction level of 40% may indicate that the heart is pumping out 40% of the heart's blood through the left ventricle for each beat. In one or more embodiments, cardiac panel 134 may be configured to output ejection fraction levels of the patient. In one or more embodiments, ejection fraction levels may be determined by analyzing changes in waveforms associated with ECG signals 124. In one or more embodiments, prolonged QRS duration or abnormal ST segment may indicate a heart conditions that is associated with a particular ejection fraction level. In one or more embodiments, cardiac panel may receive ECG input data 118 and determine an ejection fraction level of the patient. In one or more embodiments, cardiac deviation 142 may indicate a change in ejection fraction levels, such as for example, an increase from 40% to 50%. In one or more embodiments, cardiac deviation 142 may be generated as a function of cardiac panel 134. In one or more embodiments, processor 108 may receive a cardiac value 138 from a previous iteration and compare the previous cardiac value 138 to a cardiac value 138 of a current iteration. In one or more embodiments, the change between the output of the previous iteration and the output of the current iteration may be used as a cardiac deviation 142. In one or more embodiments, cardiac deviation 142 may be generated as a function of a comparison between previous ECG input data 118 received and ECG input data 118 received from the current iteration wherein changes between ECG data may indicate cardiac deviation 142. In one or more embodiments, cardiac deviation 142 may be visually displayed to a user, such as through a graph depicting changes in cardiac values over time. In one or more embodiments, cardiac deviations 142 may be used to indicate to a patient how their health has increased or decreased since a previous appointment, visit, generation of cardiac value 138 and the like. In one or more embodiments, at least one cardiac value 138 may include a cardiac deviation 142 wherein the cardiac deviation 142 includes a change in the cardiac value 138.

With continued reference to FIG. 1, cardiac deviation 142 may be used to predict future cardiac values and/or determine trends for cardiac values. In one or more embodiments, cardiac deviation 142 may be used to determine if a patient requires medication prior to experiencing a heart failure. In one or more embodiments, cardiac deviation 142 may be used to prevent various heart conditions before they occur. In one or more embodiments, cardiac deviation 142 may be used to determine if a particular medication or treatment is working due to changes in cardiac values.

Figure 2:
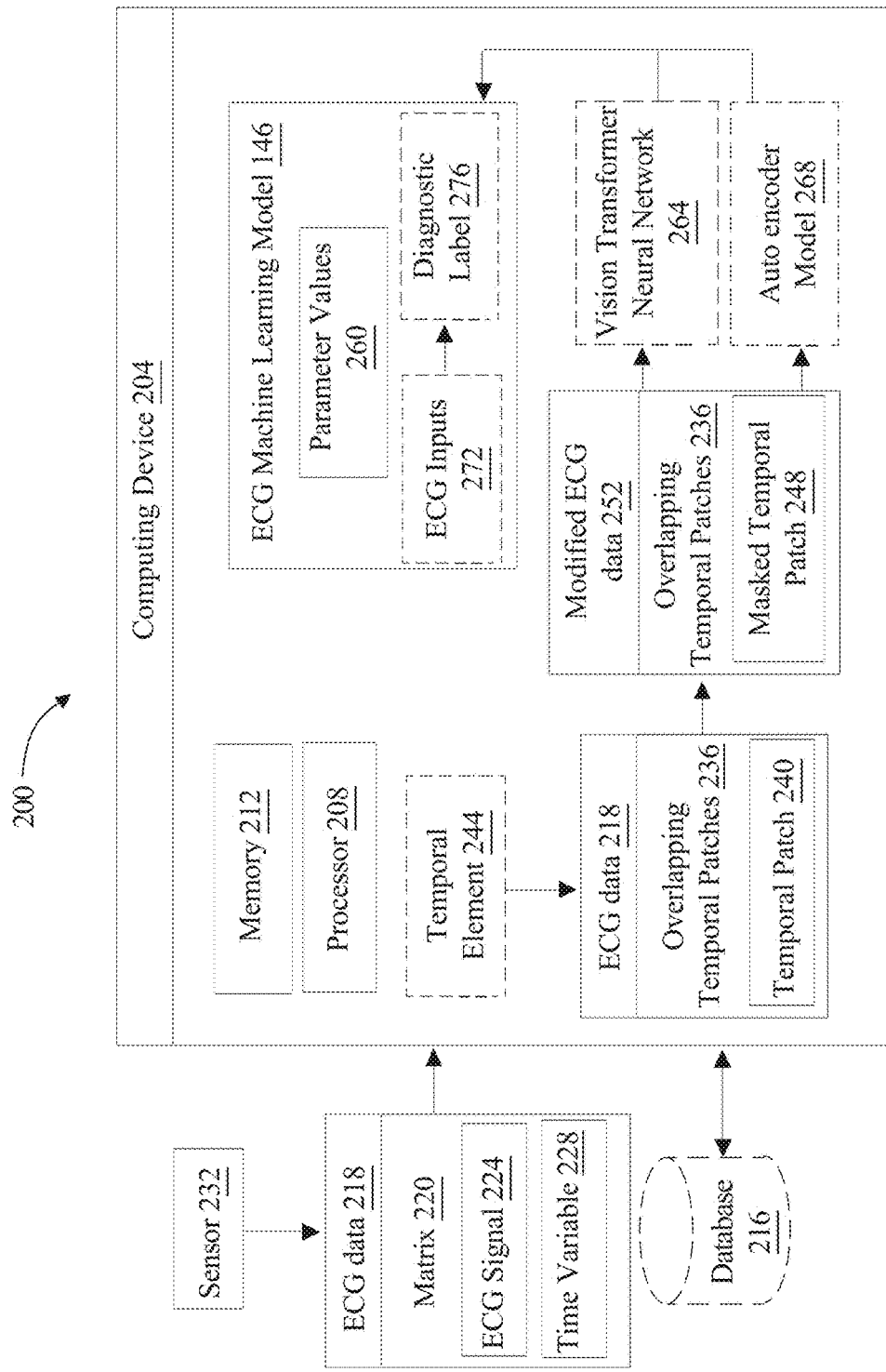
FIG. 2 is an exemplary embodiment of a system for training machine learning models in accordance with the subject disclosure.

With continued reference to FIG. 1, ECG machine learning model 146 include any machine learning model as described in this disclosure such as an ECG machine learning model 146 as described in reference to at least FIG. 2. In one or more embodiments, ECG machine learning model 146 may be pre-trained with ECG data. In one or more embodiments, ECG machine learning model 146 may receive a plurality of ECG data, wherein each ECG data contains ECG input data 118 corresponding to a particular patient. In one or more embodiments, ECG machine learning model 146 may identify features and/or representations within plurality of ECG data in order to pretrain ECG machine learning model 146. In one or more embodiments, plurality of ECG data may include unlabeled training as described in further detail below. In one or more embodiments, unlabeled training data may allow for ECG machine learning model 146 to be pre-trained such that parameter values of ECG machine learning model 146 may be iteratively adjusted in order to pretrain ECG machine learning model 146 to identify important features within ECG data. In one or more embodiments, ECG machine learning model 146 may first be pretrained using plurality of ECG data and then trained using a labeled set of training data 150. In one or more embodiments, each cardiac panel 134 may utilize a differing labeled set of training data 150. For example, and without limitation, a first cardiac panel 134 may contain a labeled set of training data 150 correlating ECG inputs and/or ECG input data 118 to cardiac values and/or cardiac deviations 142 (as described in reference to at least FIG. 2).

In one or more embodiment, each labeled set of training data 150 may be configured to correlate ECG input date to a particular cardiac value 138 such as, for example, ejection fraction levels of a patient. In one or more embodiments, ECG machine learning model 146 may be pretrained with similar training data, however each cardiac panel 134 may contain ECG machine learning model 146 that is trained on differing sets of labeled training data 150.

With continued reference to FIG. 1, labeled set of training data 150 (referred to hereafter as 'labeled training data') may be generated by a user, third party, medical professional and the like. In one or more embodiments, labeled training data 150 may include a limited amount of inputs and correlated outputs. In one or more embodiments, ECG machine learning model 146 may be pre trained on a large data set of unlabeled training data and finetuned for a particular purpose using a larger set of training data. In one or more embodiments, labeled training data 150 may be used to configuring the identified features and representations learned during pre-training for a particular purpose. In one or more embodiments, a limited data set of labeled training data 150 may be used to configure ECG machine learning model 146 for a particular purpose while a larger set of unlabeled training data may be used to identify relevant feature and representations within ECG signals 124. In one or more embodiments, labeled training data 150 may be received from a user, $3^{rd}$ party database 116, using a WebCrawler and the like. In one or more embodiments labeled training data 150 may be received from database 116 wherein database 116 may contain patients and diagnosed heart conditions. In one or more embodiments, database 116 may contain patient database 116 having patients with ECG signals 124 and associated heart conditions. In one or more embodiments, labeled training data 150 may be used to train ECG machine learning model 146. In one or more embodiments, labeled training data 150 may be used to iteratively train ECG machine learning model 146, wherein a user, operator and/or medical professional may provide feedback on outputs of ECG machine learning model 146. In one or more embodiments, labeled training data may include a plurality of ECG signals 124 and/or ECG input data 118 correlated to a plurality of cardiac values 138. In an embodiment, labeled training data and/or one set of labeled training data 150 includes a plurality of ECG input data 118 and/or ECG signals 124 correlated to a plurality of ejection fraction levels. In an embodiment, a particular ECG signal 124 and/or set of ECG input data 118 may be correlated to a particular ejection fraction level. In one or more embodiments labeled training data 150 may be classified to a cardiac value grouping wherein each cardiac value grouping may be associated with a particular cardiac value.

With continued reference to FIG. 1, in one or more embodiments, a plurality of cardiac panels 134 may exist wherein each cardiac panel 134 may be configured to identify and/or calculate a cardiac value 138 for a different heart condition and/or medical condition. In one or more embodiments, ECG machine learning models 146 within each cardiac panel 134 may be pretrained on the same or substantially similar training data. In one or more embodiments, processor 108 may be configured to select one or more cardiac panels 134 from plurality of cardiac panels 134. In one or more embodiments, processor 108 may be configured to select cardiac panels 134 as a function of user input 130. In one or more embodiment, user input 130 may include but is not limited to, receipt of information using one or more input devices and/or remote devices as described in this disclosure. In one or more embodiments, processor 108 may receive user input 130 wherein user input 130 may include selection of cardiac panels 134. In one or more embodiments, a plurality of cardiac panels 134 may be presented to user through a user interface, wherein a user may be tasked with selecting cardiac panels 134 from a list. In one or more embodiments, processor 108 may present a list of cardiac panels 134 to user wherein user may select from the list. In one or more embodiments, a user may select cardiac panels 134 that are associated with a disease or condition that requires monitoring. In one or more embodiments, a medical professional may advise user that various heart conditions require monitoring wherein user may select the cardiac panels 134 associated with their condition. In one or more embodiments, user input 130 may include inputs made by a medical professional wherein the medical professional may select cardiac panels 134 on behalf of the user. In one or more embodiments, a medical professional may, through a remote device, input various cardiac panels 134 for user in monitoring of a patient. In one or more embodiments, database 116 may include a plurality of cardiac panels 134, wherein each cardiac panels 134 includes ECG machine learning model 146. In one or more embodiments, processor 108 may be configured to select one or more cardiac panels 134 in order to generate cardiac values.

With continued reference to FIG. 1, each cardiac panel 134 may contain a separate ECG machine learning model 146 configured to output a probability associated each ejection fraction level threshold. For example, and without limitation, a first cardiac panel 134 may be configured to receive ECG input data and output a first cardiac value indicating a probability that a patient falls within a first ejection fraction level threshold. Continuing, a second cardiac panel 134 may be used to receive ECG input data 118 and output a second cardiac value indicating a probability that the patient falls within a second ejection fraction level threshold. Additionally or alternatively, each cardiac panel 134 may contain more than one ECG machine learning models 146 wherein each ECG machine learning model 146 may be configured to output a probability associated with a specific range of values associated with a heart condition. For example, and without limitation, a first cardiac panel 134 may contain a plurality of ECG machine learning models 146 wherein each ECG machine learning model 146 within the first cardiac panel may be configured to output a probability of a patient satisfying a particular ejection fraction level threshold. Continuing, the first cardiac panel 134 may be associated with probabilities associated with ejection fraction levels whereas a second d cardiac panel may include a plurality of ECG machine learning models 146 configured to output a probability of arrhythmia. In one or more embodiments, each ECG machine learning model may be trained with training data correlating a plurality of ECG input data 118 to a plurality of probabilities and/or cardiac values 138. In an embodiments, each ECG machine learning model may be classified to an ejection fraction level threshold wherein each ECG machine learning model 146 may be configured to output probabilities associated with the particular ejection fraction level threshold. In one or more embodiments, generating the one or more cardiac values from the one or more cardiac panels as a function of the ECG input data and the one or more ECG machine learning models includes generating, using a first cardiac panel of the one or more cardiac panels, a first cardiac value having a probability of the patient satisfying a first ejection fraction level threshold and generating, using a second cardiac panel of the one or more cardiac panels, a second cardiac value having a probability of the patient satisfying a second ejection fraction level threshold.

With continued reference to FIG. 1, processor 108 may be configured to compare cardiac values to cardiac baselines 154. A "cardiac baseline" for the purposes of this disclosure refers to an ideal cardiac value 138 of a healthy individual. For example, and without limitation, a cardiac baseline 154 for a cardiac value 138 associated with ejection fraction may include 50% wherein ejection fraction levels of above 50% may indicate the individual is healthy. In one or more embodiments, cardiac values may include a particular heart condition being monitored and the level of severity for the condition. In one or more embodiments, cardiac baseline 154 may include 440 milliseconds for arrythmia wherein a cardiac value 138 measured to be greater than 440 milliseconds may indicate that the patient is unhealthy or has the condition. In one or more embodiments, cardiac baseline 154 may include baselines for cardiomyopathy wherein a cardiac value 138 having an ejection fraction level of below 40% may indicate that the patient has cardiopathy. In one or more embodiments, a cardiac baseline 154 for aortic valve area is less than 1/0 cm$^2$ wherein an area less than one within cardiac value 138 may indicate valvular heart disease. In one or more embodiments, cardiac baseline 154 may include any reference range for cardiac values such as not limited to, blood pressure, Ankle-Brachial index, oxygen saturation. Mean pulmonary arterial pressure, and the like. In one or more embodiments, database 116 may contain cardiac baseline 154 for each cardiac panel 134 wherein cardiac value 138 may be compared to cardiac baseline 154 to determine the health of a patient in comparison to an ideal healthy individual.

With continued reference to FIG. 1, processor 108 may be configured to display and/or present cardiac values 138 to user. In one or more embodiments, cardiac values may be presented through a user interface and/or a graphical user interface. In one or more embodiments, processor 108 may be configured to create a user interface data structure. As used in this disclosure, "user interface data structure" is a data structure representing a specialized formatting of data on a computer configured such that the information can be effectively presented for a user interface. User interface data structure may include cardiac values generated from each cardiac panel 134. In one more embodiments, user interface data structure may include information needed to generate graphical representation of cardiac values. In one or more embodiments, user interface data structure may include any other data as described in this disclosure. In one or more embodiments, user interface data structure may allow for interaction with cardiac values wherein a user may view their health in relation to various heart conditions.

With continued reference to FIG. 1, processor 108 may be configured to transmit the user interface data structure to a graphical user interface. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Processor 108 may transmit the data described above to database 116 wherein the data may be accessed from database 116. Processor 108 may further transmit the data above to a device display or another computing device 104.

With continued reference to FIG. 1, system 100 may include a graphical user interface (GUI 158). For the purposes of this disclosure, a "user interface" is a means by which a user and a computer system interact. For example, through the use of input devices and software. In some cases, processor 108 may be configured to modify graphical user interface as a function of the cardiac values and/or outputs of cardiac panels 134 by populating user interface data structure and visually presenting the data through modification of the graphical user interface. A user interface may include graphical user interface, command line interface (CLI), menu-driven user interface, touch user interface, voice user interface (VUI), form-based user interface, any combination thereof and the like. In some embodiments, a user may interact with the user interface using a computing device 104 distinct from and communicatively connected to processor 108. For example, a smart phone, smart tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a user interface that allows users to interact with electronic devices through visual representations. In some embodiments, GUI 158 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in graphical user interface. Persons skilled in the art, upon reviewing the entirety of this disclosure, will be aware of various ways in which a graphical user interface and/or elements thereof may be implemented and/or used as described in this disclosure. In one or more embodiments, graphical user interface may include a graphical visualization of the human heart and various locations as to which attention may be needed.

With continued reference to FIG. 1, system 100 may further include a display device 162 communicatively connected to at least a processor 108. "Display device" for the purposes of this disclosure is a device configured to show visual information. In some cases, display device 162 may include a liquid crystal display (LCD), a cathode ray tube (CRT), a plasma display, a light emitting diode (LED) display, and any combinations thereof. Display device may include, but is not limited to, a smartphone, tablet, laptop, monitor, tablet, and the like. Display device may include a separate device that includes a transparent screen configured to display computer generated images and/or information. In some cases, display device 162 may be configured to visually present one or more data through GUI 158 to a user, wherein a user may interact with the data through GUI 158. In some cases, a user may view GUI 158 through display.

With continued reference to FIG. 1, system 100 may include and/or be included within a mobile unit. "Mobile unit" for the purposes of this disclosure is a device that is capable of being transported from one location to another. In one or more embodiments, mobile unit may include wheels that allow mobile unit to be moved from one location to another. In one or more embodiments, display device 162 may be located atop mobile unit wherein a user may navigate mobile unit with display device 162 around a room. In one or more embodiments, mobile unit May contain a battery pack wherein computing device 104 may be powered by battery back. In one or more embodiments, battery pack may be rechargeable. In one or more embodiments, one or more processes as described above, such as but not limited to processing relating to machine learning models, may be computed on a cloud, network server and the like to save on battery power. In one or more embodiments, mobile unit may allow for system to be navigated throughout an operating room. In one or more embodiments, location of mobile unit may differ for each patient. In one or more embodiments, sensors as described above may be connected to mobile unit wherein mobile unit may be navigated closer to and/or further away from patient based on the location of sensors. In one or more embodiments, sensors may contain wiring that needs to be physically connected to mobile unit. In one or more embodiments, mobile unit may allow for movement of system from one location to another in instances in which movement may be needed. In one or more embodiments, mobile unit may allow for receipt of ECG input data 118 from a patient in order to generate cardiac values.

With continued reference to FIG. 1, GUI 158 may be configured to visually present cardiac values wherein cardiac values may be visualized on a two dimensional chart, on a heat map, as a color coding and the like. In one or more embodiments, cardiac deviations 142 may be color coded wherein positive cardiac deviations 142 (i.e. the patient's condition is improving) may be color coded green whereas negative cardiac deviations 142 may be color coded red. In one or more embodiments, cardiac deviations 142 may be graphed in order to visualize changes in cardiac values. In one or more embodiments, cardiac values may be displayed with corresponding cardiac baselines 154 wherein a user may visualize their health in association with the health of an ideal individual. In one or more embodiments, processor 108 may be configured to generate a graphical visualization wherein graphical visualization may include the visualization of data through the use of graphics such as but not limited to, two dimensional charts, three dimensional charts, heat maps, color coded data and the like. In an embodiment, data may be visualized wherein colors or placement of data with a GUI 158 may be indicative of a particular set of information. In one or more embodiments, processor 108 may be configured to generate graphical visualizations of cardiac values by graphing cardiac values, color coding cardiac values in comparison to a cardiac baseline 154, color coding cardiac deviations 142 and the like. In one or more embodiments, processor 108 may be configured to display multiple graphical visualizations on a single display screen wherein each graphical visualization may correspond to a particular cardiac panel 134 and/or cardiac value 138. In one or more embodiments, cardiac values may be displayed within a single display screen such that a user and/or medical professional may make determinations and/or find correlations between cardiac values.

Referring now to FIG. 2, a system 200 for training machine learning models is described. In one or more embodiments, system 200 may include a computing device 204 having a processor 208 and a memory 212 communicatively connected to the processor 208. In one or more embodiments, system may include a database 216 such as any database as described in this disclosure.

In one or more embodiments, system 200 may be configured to receive a plurality of ECG data 218. In one or more embodiments, ECG data 218 may include ECG input data 118 as described above. In one or more embodiments, plurality of ECG data 218 may include a plurality of ECG input data 118. In an embodiment, plurality of ECG data 218 may include electrocardiogram signals 224 received from a plurality of individuals. In one or more embodiments, ECG data 218 may include a matrix 220 containing ECG signals 224 with associated time variables 228. In one or more embodiments, ECG data 218 may be received from sensors 232 such as any sensors as described in this disclosure. In an embodiment, each ECG data 218 may correspond to a particular individual and/or patient wherein plurality of ECG data may correspond to a plurality of patients. In one or more embodiments, plurality of ECG data may be received from database, such as a patient database, using a web crawler and the like. In one or more embodiments, ECG signals may be received from a plurality of individuals seeking medical attention wherein the ECG signals may be recorded as ECG data 218 and stored on database 216. In one or more embodiments, ECG data 218 may include a matrix 220 of ECG signals 224 and associated time variables 228 similar to that of ECG input data 118. In one or more embodiments, ECG data may be received from one or more sensors 232 such as any sensors as described in this disclosure.

With continued reference to FIG. 2, ECG data 218 may include unlabeled training data. "Unlabeled training data" for the purposes of this disclosure is data that lacks distinct element or classifiers that can be used to train a machine learning model. in an embodiment, unlabeled training data may include data that has not been classified by an individual or computing system. In one or more embodiments, "labeled training data" may refer to data that has been labeled and configured to training machine learning models. in an embodiment, labeled training data may include training data with inputs and correlated outputs. In an embodiment, unlabeled training data may include data that has not been modified to train machine learning models. In one or more embodiments, Unlabeled training data may include data received directly from one or more sensors 232 without modification. In one or more embodiments, unlabeled training data may include data that may be used for training of one or more machine learning models but has not been specifically modified for training of one or more machine learning models. In one or more embodiments, unlabeled training data may lack tags, labels, classifications, correlated outputs and the like. In one or more embodiments, ECG data 218 may contain unlabeled training data wherein ECG data 218 may contain data received directly from one or more sensors 232 and/or leads. Training data may be described in further detail below.

With continued reference 1, processor 208 may be configured to create one or more overlapping temporal patches 236 from the plurality of ECG data 218. A "temporal patch" for the purposes of this disclosure refers to a portion of ECG signals 224 over a given period of time. For example, and without limitation, ECG signals 224 may be recorded over a time period of 0 to 200 seconds wherein temporal patch 240 may correspond to ECG signals 224 received from the time interval of 20 seconds to 30 seconds. In an embodiment, temporal patch 240 refers to a segment of ECG data 218 wherein the segment corresponds to a particular time frame or given period of time. In one or more embodiments, Temporal patch 240 may refer to a segment or portion of ECG set wherein the segment includes ECG signals 224 over a particular time frame. in an embodiment, Temporal patch 240 refers to a given set of ECG signals 224 received from one sensor 232 over a given time frame. For example, and without limitation, ECG data 218 may include ECG signals 224 received from leads II, III, V1, V2, V3, V4, wherein temporal patch 240 may include ECG signals 224 from lead II over a particular time frame and/or time period. In one or more embodiments, temporal patch 240 may refer to a portion of ECG signals 224 received from a particular sensor 232, such as for example, a portion of ECG signals 224 received from lead II. "Overlapping temporal patches" for the purposes of this disclosure refer to temporal patches 240 from one or more sensors 232 that correspond to similar time frames. For example, and without limitation, overlapping temporal patches 236 may include a portion of ECG signals 224 associated with Leads II and III wherein the portion of ECG signals 224 correspond to ECG signals 224 received over a period of 10 seconds to 20 seconds. In one or more embodiments, temporal patches 240 may include segments of data received from each sensor 232 that correspond to similar time frames. In one or more embodiments, overlapping temporal patches 236 may correspond to temporal patches 240 from each ECG set that contain similar time variables 228, similar ranges of time variables 228 and the like. in an embodiment, each ECG set may contain ECG signals 224 received from each sensor 232 over a given period of time wherein overlapping temporal patches 236 may include segments of each ECG set corresponding to similar periods of time in which the ECG signals 224 were received. In one or more embodiments, ECG data 218 may include data received from 8 differing leads wherein overlapping temporal patches 236 may include segments of the data over a similar time frame. In one or more embodiments, overlapping temporal patches 236 may include ECG signals 224 received from differing sensors 232 with similar time variables 228. For example, and without limitation, ECG signals 224 associated with time variables 228 ranging from 0 to 10 seconds may include a temporal patch 240, wherein multiple temporal patches 240 with similar time variables 228 may be included in overlapping temporal patches 236. In one or more embodiments, overlapping temporal patches 236 may include temporal patches 240 with similar time variables 228, similar ranges of time variables 228, ECG signals 224 received over similar periods of time and the like. In one or more embodiments, each temporal patch 240 of the overlapping temporal patches 236 includes a segment of voltage signals from each of the one or more leads and/or sensors 232. In one or more embodiments, temporal patches 240 within overlapping temporal patches 236 may be referred to singularly as 'overlapping temporal patch.' In one or more embodiments, overlapping temporal patch may correspond to a singular temporal patch 240 within a plurality of overlapping temporal patches 236.

With continued reference to FIG. 2, ECG signals 224 associated with each sensor 232 may be segmented into multiple temporal patches 240 wherein each temporal patch 240 may correspond to ECG signals 224 over a given period of time. In one or more embodiments, ECG set may be segmented into multiple temporal patches 240. For example, and without limitation, sensor 232 may record ECG signals 224 over a span of 200 seconds wherein each 10 seconds may refer to temporal patch 240. Continuing, multiple sensors 232 may record ECG signals 224 over a span of 200 seconds wherein the first ten seconds of each sensor 232 may be referred to as overlapping temporal patches 236. In one or more embodiments, each ECG set may include information of ECG signals 224 over a given time received from each sensor 232 wherein overlapping temporal patches 236 may include segments of the ECG sets having similar timeframes and/or variables. In one or more embodiments, processor 208 may be configured to create overlapping temporal patches 236 by segmenting ECG data 218 based on time variables 228 wherein for example, ECG signals 224 received from sensors 232 may be segmented into 5 second time frames. In one or more embodiments, each matrix 220 may include ECG signals 224 received from each sensor 232 and corresponding time variables 228. In an embodiment, Matrix 220 may be segmented into temporal patches 240 wherein each temporal patch 240 may contain ECG signals 224 over particular time frame. In one or more embodiments, overlapping temporal patches 236 may include segmented matrices having similar time variables 228 (e.g. similar time periods corresponding to ECG signals 224).

With continued reference to FIG. 2, ECG data 218 and/or ECG sets may be divided and/or segmented into multiple consecutive non-overlapping temporal patches 236 (say P), such that each patch is an array of shape N×(T//P). Therefore, the first patch may contain all N leads with data points coming from time 0 to T//P, the second patch would contain all N leads coming from points T//P to 2T//P, and the like. In one or more embodiments, N may denote the number of leads and T may denote the number of ECG signals 224 and/or voltage signals, wherein T may depend on the frequency of the acquired ECG signal 224 (say f) and the length of the signal in seconds (say S), i.e., T=f*S. In one or more embodiments, an array of N×T may be segmented into multiple overlapping temporal patches 236 wherein each set of overlapping temporal patches 236 may include an array denoted as N×(T//P) wherein P may denote the amount of temporal patches 240 created for each set of ECG signals 224. For example, and without limitation, a value of P such as 3 may indicate that the set of ECG signals 224 is divided into three segments wherein the first segment (i.e., first set of temporal patches 240) may contain a time frame of 0 to T//3, the second segment may contain a time frame of T//3 to 2T//3 and the third segment may contain a timeframe of 2T//3 to 3T//3.

In one or more embodiments, processor 208 may be configured to create one or more overlapping temporal patches 236 as a function of a temporal element 244. A "temporal element" for the purposes of this disclosure is information indicating a time frame associated with each temporal patch 240. For example, and without limitation, temporal element 244 may be 10 seconds wherein each temporal patch 240 may include a series of ECG signals 224 received over the span of 10 seconds. In one or more embodiments, temporal element 244 may include time ranges such as but not limited to ranges of 5 milliseconds (ms), 10 ms, 15 ms, 20 ms, 30 ms, 40 ms, and the like. In one or more embodiments, temporal element 244 may indicate how many segments may be created from a set of ECG signals 224. For example, and without limitation, temporal element 244 may include a number such as '4' wherein 4 may indicate that the ECG signals 224 should be separated into 4 segments. In one or more embodiments, temporal element 244 may indicate how many temporal patches 240 should be created for each set of ECG signals 224 associated with each sensor 232. In one or more embodiments, temporal element 244 may be denoted as 'P' as shown above wherein the numerical value of 'p' may indicate how many segments ECG signals 224 should be split into. For example, and without limitation, a temporal element 244 having a value of 3 may indicate that the ECG signals 224 should be split into 3 segments. In one or more embodiments, Temporal elements 244 may be received as a function of user input wherein an individual interacting and/or associated with system 200 may indicate the amount of overlapping temporal patches 236 to be created. In one or more embodiments, temporal elements 244 may be generated by processor 208. In one or more embodiments, processor 208 may be configured to generate smaller temporal patches 240 wherein smaller temporal patches 240 may indicate ECG signals 224 over a smaller time frame. In one or more embodiments, processor 208 may be configured to generate multiple temporal patches 240 and decrease the amount of temporal patches 240 following each iteration and/or following success of each processing of data. For example, and without limitation a set of ECG signals 224 recorded over a span of 200 seconds may first be split into 20 temporal patches 240 wherein each temporal patch 240 may include ECG signals 224 recorded over a range of 5 seconds. Continuing, processor 208 may be configured to reduce the number of temporal patches 240 wherein on a next iteration, processor 208 may be segment the ECG signals 224 into 10 temporal patches 240 such that each temporal patch 240 includes ECG signals 224 recorded over a range of 10 seconds. in an embodiment, processor 208 may increase or reduce the number of temporal patches 240 in order to train one or more machine learning models as described in this disclosure. In an embodiment, and as described in further detail below, temporal patches 240 may be removed to train machine learning models wherein larger temporal patches 240 may be more difficult to predict whereas smaller temporal patches 240 may be easier for the machine learning model to predict. in an embodiment, processor 208 may increase or decrease temporal element 244 in order to better train the machine learning model as described below.

With continued reference to FIG. 2, each ECG set may contain multiple temporal patches 240. In one or more embodiments, each temporal patch 240 within each ECG set may contain corresponding overlapping temporal patches 236 wherein the overlapping temporal patches 236 are temporal patches 240 from other ECG sets. In one or more embodiments, ECG data 218 may contain multiple sets of overlapping temporal patches 236 wherein each set of overlapping temporal patches 236 may contain a temporal patch 240 from each ECG set with similar time variables 228. For example, and without limitation, a first set of overlapping temporal patches 236 may contain a temporal patch 240 ranging from 0 and 10 seconds in a first ECG set, a first temporal patch 240 ranging from 0 and 10 seconds in a Second ECG set, a first temporal patch 240 ranging from 0 and 10 seconds in a third ECG set and the like. Continuing, a second set of overlapping temporal patches 236 may contain a second temporal patch 240 ranging from 10 and 20 seconds in a first ECG set, a second temporal patch 240 ranging from 10 and 20 seconds in a second ECG set, a second temporal patch 240 ranging from 10 and 20 seconds in a third ECG set and the like. In one or more embodiments, processor 208 may be configured to create sets of overlapping temporal patches 236 wherein each set contains temporal patches 240 from each ECG set with similar time variables 228.

With continued reference to FIG. 2, temporal patches 240 may be consecutive wherein, for example, a first temporal patch 240 may include recorded ECG signals 224 from 0 to 10 seconds, a second temporal patch 240 may include ECG signals 224 from 10 to 20 seconds and the like. In one or more embodiments, processor 208 may be configured to segment Matrix 220 into multiple submatrices wherein each submatrices may contain a portion of Matrix 220.

With continued reference to FIG. 2, processor 208 may be configured to mask at least one overlapping temporal patch from the one or more overlapping temporal patches 236. In one or more embodiments, a process of masking temporal patches 240 may include the removal of the information associated with one or more temporal patches 240 from ECG data 218. In one or more embodiments, masking at least one overlapping temporal patch may include the removal of at least one temporal patch 240 from a set of overlapping temporal patches 236. In one or more embodiments, masking at least one temporal patch 240 may include the removal of a set of temporal patches 240 from a plurality of sets of temporal patches 240 within ECG data 218. In one or more embodiments, processor 208 may be configured to randomly remove or obscure temporal patches 240 from each set of temporal patches 236. In one or more embodiments, a plurality of sets of overlapping temporal patches 236 may exist within ECG data 218 wherein processor 208 may configured to mask at least one set of temporal patches 240. In one or more embodiments, processor 208 may remove more than one temporal patches 240 from each set of overlapping temporal patches 236. In one or more embodiments, processor 208 may iteratively remove one or more temporal patches 240 following each iteration of the processing in order to train a machine learning model as will be described in further detail below. In one or more embodiments, processor 208 may be configured to remove temporal patches 240 and/or set of overlapping temporal patches 236 consecutively wherein a first temporal match and/or first set of overlapping temporal patches 236 may be removed, wherein one or more processes (e.g. prediction of masked temporal patches) may be completed, and the first set may be placed back, and a second set removed. In one or more embodiments, a process of masking may include preventing a computing system from asking a particular set of information without removing the information. In one or more embodiments, processor 208 may mask at least one overlapping temporal patch from the one or more overlapping temporal patches 236 by radiantly masking at least one overlapping temporal patch. In one or more embodiments, processor 208 may use pseudorandom number generation in order to generate random numerical value which may correspond to temporal patches 240 to be removed. In one or more embodiments, processor 208 may use true random number generation wherein processor 208 may use atmospheric noise, clock speed, CPU temperature, radioactive decay and the like in order to generate random variables which may be used to select temporal patches 240 and/or overlapping temporal patches 236 to be masked. In one or more embodiments, processor 208 may be configured to mask at least one temporal patch 240 within at least one set of overlapping temporal patches 236. In one or more embodiments, processor 208 may be configured to mask at least one set of overlapping temporal patches 236 from a plurality of sets of overlapping temporal patches 236. In one or more embodiments, a masked temporal patch 248 may be used to train one or more machine learning models as described in further detail below. In one or more embodiments, temporal patches 240 and/or sets of overlapping temporal patches 236 which are masked may be referred to as "masked temporal patches".

With continued reference to FIG. 2, in one or more embodiments, processor 208 may be configured to generate modified ECG data 252. "Modified ECG data" for the purposes of this disclosure is ECG data 218 in which one or more temporal patches 240 have been masked. For example, and without limitation, modified ECG data 252 may lack a particular set of ECG values associated with a particular time frame. In another non limiting example, an ECG set within ECG data 218 may contain missing temporal patches 240. In one or more embodiments, ECG data 218 may contain a multiple set of overlapping temporal patches 236 wherein modified ECG data 252 may lack at least one of the multiple sets of overlapping temporal patches 236. In one or more embodiments, processor 208 may modify ECG data 218 by removing at least one temporal patch 240 and/or at least one set of overlapping temporal patches 236.

With continued reference to FIG. 2, processor 208 may be configured to pretrain an ECG machine learning model 146 to predict at least one masked overlapping temporal patch of the one or more overlapping temporal patches 236. In one or more embodiments, computing device 204 may include a machine learning module to implement one or more algorithms or generate one or more machine-learning models to generate outputs. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 216, user inputs and/or be provided by a user. In other embodiments, a machine-learning module may obtain a training set by querying a communicatively connected database 216 that includes past inputs and outputs. Training data may include inputs from various types of databases 216, resources, libraries, dependencies and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module may be used to create a machine learning model and/or any other machine learning model using training data. Training data may be data sets that have already been converted from raw data whether manually, by machine, or any other method. In some cases, the machine learning model may be trained based on user input. For example, a user may indicate that information that has been output is inaccurate wherein the machine learning model may be trained as a function of the user input. In some cases, the machine learning model may allow for improvements to computing device 204 such as but not limited to improvements relating to comparing data items, the ability to sort efficiently, an increase in accuracy of analytical methods and the like.

With continued reference to FIG. 2, in one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database 216, and/or be provided by a user. In other embodiments, machine-learning module may obtain a training set by querying a communicatively connected database 216 that includes past inputs and outputs. Training data may include inputs from various types of databases 216, resources, libraries, dependencies and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. An "ECG machine learning model" for the purposes of this disclosure is a machine learning model configured to receive ECG signals 224 as inputs and output information associated with the ECG signals 224. For example, and without limitation, ECG machine learning model 146 may receive ECG signals 224 and output values associated with a disease, a predicted heart abnormality and the like. In one or more embodiments, ECG machine learning model may be configured to receive ECG input data 118 as described in reference to at least FIG. 1 and output cardiac values. In an embodiment, ECG machine learning model 146 may be used to predict and/or calculate the severity of various heart conditions that have occurred, are currently occurring and/or will occur in the future based on an individual's current electrocardiogram signals received. ECG machine learning model 146 is described in further detail below.

With continued reference to FIG. 2, processor 208 may be configured to pretrain ECG machine learning model 146. "Pretraining a machine learning model" as referred to herein refers to a computational process in which a machine learning model is trained on a large data set to learn general features or representation before fine tuning the machine learning model for a specific task. For example, and without limitation, pre-training ECG machine learning model 146 may include determining waveform patterns, heart rate variability, and other relevant characteristics of the ECG signals 224 within ECG data 218 and/or modified ECG data 252. In one or more embodiments, pretraining ECG machine learning model 146 may allow for ECG machine learning model 146 to make determinations on unlabeled training data. In one or more embodiments, ECG machine learning model 146 may make determination on modified ECG data 252 such as relevant features, patterns and the like wherein the determinations may be used as training data when fine tuning ECG machine learning model 146 for a particular cardiac related purpose. In one or more embodiments, pretraining ECG machine learning model 146 may allow for unlabeled training data such as ECG data 218 to be used for multiple purposes. For example, and without limitation, ECG data 218 may be used to determine cardiac values in one machine learning model and used to determine heart diseases in another machine learning model. In one or more embodiments, pretraining a machine learning model may allow for a machine learning model to leverage general knowledge from a broad dataset, such as ECG data 218, in order to better generate outputs using a limited labeled training data set. In one or more embodiments, pretraining ECG machine learning model 146 may allow for determinations of relevant features, patterns and the like within ECG data 218 prior to training ECG machine learning model 146 for a particular and/or specific use. In one or more embodiments, ECG machine learning model 146 may contain labeled training data containing inputs such as ECG signals 224 and correlated disease states, disease classifications and the like. in an embodiment, labeled training data may be used to make determinations about ECG data 218 and create a larger set of training data. In one or more embodiments, pretraining may allow for iterative training of ECG machine learning model 146 absent human input. In an embodiment, processor 208 may be configured to receive ECG signals 224 from patients, and pretrain ECG machine learning model 146 to determine relevant features, patterns and the like. In an embodiment, ECG machine learning model 146 may be pre-trained following receipt of ECG signals 224 from a patient. In one or more embodiments, ECG machine learning model 146 may be iteratively trained with large data sets containing ECG signals 224 such as ECG data 218. In one or more embodiments, pretraining ECG machine learning model 146 may include utilizing an unlabeled training data set such as ECG data 218 to generate its own labels based on the unlabeled training data received.

With continued reference to FIG. 2, pretraining ECG machine learning model 146 includes a process in which ECG machine learning model 146 and/or processor 208 predicts missing, masked temporal patches 248 and/or sets of overlapping temporal patches 236. For example, and without limitation, ECG machine learning model 146 may predict missing temporal patches 240 within modified ECG data 252, wherein ECG machine learning model 146 may compare predictions to the actual information contained within temporal patches 240 and/or sets of overlapping temporal patches 236 as indicated by ECG data 218. In one or more embodiments, ECG machine learning model 146 may be configured to receive modified ECG data 252 wherein ECG machine learning model 146 may be tasked with determining masked portions of modified ECG data 252 such as masked temporal patches 248. In one or more embodiments, ECG machine learning model 146 may be configured with a pretext task using modified ECG data 252. In one or more embodiments, the pretext task may include predicting and/or finding missing temporal patches 240. In one or more embodiments, ECG machine learning model 146 may extract relevant features from modified ECG data 252 in order to predict masked temporal patches 248. In one or more embodiments, ECG machine learning model 146 may contain a redetermined set of values of parameters wherein the parameters refer to weights and biases. In one or more embodiments, parameters may be initialized randomly or received from similar machine learning models. In one or more embodiments, during pretraining, parameters of ECG machine learning model 146 may be given initial values wherein the parameters may change in order to fine tune machine learning model for a specific purpose. In one or more embodiments, pretraining involves modifying parameters before training of the machine learning model based on the input data such as ECG data 218 in order to learn meaningful representations or features that can be further refined further on in order fine tune ECG machine learning model 146 for a specific task. In one or more embodiments, ECG machine learning model 146 may receive as an input modified ECG data 252 and predict masked temporal patches 248. In one or more embodiments, ECG machine learning model 146 may compare predictions of the masked temporal patches 248 to the masked temporal patches 248. In one or more embodiments, ECG machine learning model 146 may utilize a loss function in order to measure the discrepancy between predicted outputs of ECG machine learning model 146 and the actual masked temporal patches 248. In one or more embodiments, ECG machine learning model 146 may adjust parameters iteratively through optimization techniques such as, but not limited to gradient descent to minimize the discrepancy.

In one or more embodiments, a machine learning model such as ECG machine learning model 146 may contain parameter values 260. "Parameter values" for the purposes of this disclosure are internal variables that a machine learning model has generated from training data in order to make predictions. In one or more embodiments, parameter values 260 may be adjusted during training or pretraining in order to minimize a loss function. In one or more embodiments, during training, predicted outputs of the machine learning model are compared to actual outputs wherein the discrepancy between predicted output and actual outputs are measured in order to minimize a loss function. A loss function also known an "error function" may measure the difference between predicted outputs and actual outputs in order to improve the performance of the machine learning model. A loss function may quantify the error margin between a predicted output and an actual output wherein the error margin may be sought to be minimized during the training process. The loss function may allow for minimization of discrepancies between predicted outputs and actual outputs of the machine learning model. In one or more embodiments, the loss function may adjust parameter values 260 of the machine learning model. In one or more embodiments, in a linear regression model, parameter values 260 may include coefficient assigned to each feature and the bias term. In one or more embodiments, in a neural network, parameter values 260 may include weights and biases associated with the connection between neurons or nodes within layers of the network. In one or more embodiments, during training and/or pretraining of the machine learning model parameter values 260 of the machine learning model may be adjusted as a function of at least one predicted masked temporal patch 248 and the at least one masked temporal patch 248. In one or more embodiments, processor 208 may be configured to minimize a loss function by adjusting parameter values 260 of ECG machine learning model 146 based on discrepancies between predicted masked temporal patches 248 and masked temporal patches 248. In one or more embodiments, processor 208 may be configured to iteratively pretrain ECG machine learning model 146, wherein processor 208 may be configured to iteratively receive ECG signals 224 from patients and adjust parameter values 260 of ECG machine learning model 146. In an embodiment, the more ECG data 218 and/or ECG signals 224 received by ECG machine learning model 146, the more accurate the ECG machine learning model 146 may be in predicting masked temporal patches 248. In one or more embodiments, parameter values 260 may correspond to learned features of ECG data 218, such as waveforms, patterns, frequencies and the like.

With continued reference to FIG. 2, pretraining ECG machine learning model 146 may include receiving modified ECG data 252 and predicting and/or recreating masked temporal patches 248. In one or more embodiments, parameter values 260 may be adjusted based on predicted masked temporal patches 248 and masked temporal patches 248. In one or more embodiments, pretraining ECG machine learning model 146 may include pretraining ECG machine learning using a vision transformer neural network 264. In one or more embodiments, processor 208 may utilize vison transformer neural network to recreate masked temporal patches 248 wherein recreated masked temporal patches 248 may be compared to masked temporal patches 248. Vision transformer neural network 264 is a machine learning model that processes images in segments in portions called patches. In a vision transformer neural network 264 may process an image pixel by pixel or by sets of pixels. In one or more embodiments, vision transformer neural networks 264 may utilize a self-attention mechanism in order to weight important parts of an input image when making predictions. In one or more embodiments, vision transformer neural network 264 may predict missing temporal matches of ECG sets similar to an inpainting process in which missing parts of an image are predicted or filled. In one or more embodiments, ECG data 218 may be transformed into an image-like structure in order to be processed by vision transformer neural network 264. In one or more embodiments, ECG data 218 may be converted from a textual format to a format such as a spectrogram, a graph a time-frequency representation and the like. In one or more embodiments, Segments of ECG data 218 may be removed such as temporal patches 240 as described above. In one or more embodiments, modified ECG data 252 may be represented in an image like structure wherein the image like structure may contain missing portions corresponding to the masked temporal patches 248. In one or more embodiments, Vision transformer neural network 264 may receive modified ECG data 252 as an input wherein vision transformer neural network 264 may be configured to predict masked temporal patches 248 in an image-like format, such as in a graphical format. In one or more embodiments, vision transformer neural network 264 may be configured to receive information within a one dimensional format, such as an image. In one more embodiments, vision transformer neural network 264 may be configured to adjust inputs to accept the dimensionality of the patch and tweak position embeddings to reflect temporal elements. In one or more embodiments, the visional transformer neural network may utilize self-attention mechanism in order to understand relationships dependencies and the like in the image-like structure of the ECG signals 224. In one or more embodiments, similar to natural language processing, vision transformer neural network 264 may weigh the importance of different parts of an input when making predictions. In one or more embodiments, the input may be transformed into three sets of vectors; a query, a key and a value. The query vector is compared with each key vector in the sequence and the result values are called attention score. These score indicate how relevant each element in the sequence is to the current element being processed. In one or more embodiments, vision transformer neural network 264 may processes sequences of data such as ECG data 218 and/or modified ECG data 252 in order to capture dependencies of the data. The model is then tasked with predicting missing segments such as temporal patches 240 based on the received inputs. In one or more embodiments, vision transformer neural network 264 may utilize inference to infer missing portions of a graphical representation of ECG signals 224. In one or more embodiments, the model may be evaluated based on outputs wherein visions transformer may be trained to generate more accurate outputs, and the like. In one or more embodiments, vision transformer neural network 264 may contain parameter values 260 such as but not limited to weights, biases, positional encodings, attention weights, classifier weights and the like. Weights may include numerical values associated with connections between neurons wherein weights may indicate the strength of the connection. Biases may include additional parameters associated with the neurons in order to provide an offset or shift to output values. Attention weights may include the importance each token should give another token in a sequence. Positional encodings may input about the spatial relationships between token in the input image. Classifier weights may include weights associated with each label. in an embodiment, vision transformer neural network 264 may adjust parameter values 260 in order to minimize a loss function and generate more accurate outputs. In one or more embodiments, parameters may be adjusted to minimize error and/or discrepancies between the models predictions and actual results. In one or more embodiments, processor 208 may be configured to adjust one or more parameter values 260 of the ECG machine learning model 146 as a function of the at least one predicted masked temporal patch 248 and the at least one masked temporal patch 248.

With continued reference to FIG. 2, ECG machine learning model 146 may include a machine learning model configured to receive graphical representations and/or images of ECG signals 224. In one or more embodiments, ECG signals 224 may be received in the form of an image, a graphical representation and/or any other visual depiction. In one or more embodiments, pre training ECG machine learning model 146 may include pre training ECG machine learning model 146 with textual data. In one or more embodiments, Vision transformer neural network 264 may receive ECG data 218 in textual format, construct an image-like structure of ECG data 218 and pre-train ECG machine learning model 146 as a function of the image-like structure. in an embodiment, a machine learning model configured to receive images may be trained with information within a textual format. In one or more embodiments, pre training a machine learning model with textual information may allow for decreased computational power, increased computational efficiency, faster processing, and the like. In one or more embodiments, vision transformer neural network 264 may receive ECG data 218, modify ECG data 218 into an image like structure and generate parameter values 260 indicating relationships and representations between the image-like structures. In one or more embodiments, ECG machine learning model 146 may be iteratively trained with textual information even though ECG machine learning model 146 may be configured to receive images as inputs.

With continued reference to FIG. 2, pretraining ECG machine learning model 146 may include the use of one or more autoencoder models 268. An autoencoder model 268 is a machine learning model used for unsupervised machine learning in which inputs are transformed into compressed form of the input data and the inputs are re-created using the compressed form of data. In one or more embodiments, autoencoder model 268 learns a compressed representation of data wherein autoencoder model 268 may determine relevant features of the data. In one or more embodiments, autoencoder model 268 minimizes reconstruction error by adjusting parameter values 260 in order to recreate the input. In one or more embodiments, autoencoder model 268 may receive as an input ECG data 218 and/or modified ECG data 252 wherein autoencoder model 268 may compress ECG data 218 and attempt to recreate ECG data 218. In one or more embodiments, autoencoder model 268 may learn representations between ECG signals 224 by compressing ECG signals 224 into a lower latent space. In one or more embodiments, compression may include the process of removing noise or unwanted signals to remove excess information from ECG signals 224. In one or more embodiments, autoencoder model 268 may be configured to capture important representation of ECG data 218 during compression wherein ECG models may be reconstructed during decoding. In one or more embodiments, autoencoder model 268 may compare encoded inputs to decoded inputs in order to adjust parameter values 260 of the autoencoder model 268. In one or more embodiments, retraining ECG machine learning model 146 may include training autoencoder model 268 to reduce reconstruction error when reconstructing compressed inputs such as ECG data 218. In one or more embodiments, autoencoder model 268 may capture meaningful representations during compression such as irregular patterns, frequencies and the like. In one or more embodiments, autoencoder model 268 may be used to detect anomalies within ECG data 218 wherein autoencoder model 268 may be trained with ECG data 218 representing regular heart activity such that reconstruction of anomalies may indicate a higher reconstruction error and thereby an issue. In one or more embodiments, autoencoder model 268 may contain an encoding function in which input data is transformed and/or compressed. In one or more embodiments, autoencoder model 268 may contain a decoding function in which input data is recreated from the transformed or compressed data. In one or more embodiments, autoencoder model 268 may be iteratively trained to reduce construction loss wherein construction loss refers to the accuracy of the decoded output in comparison to the input. In one or more embodiments, autoencoder model 268 may capture only those variations in data that are needed to reconstruct the input. For example, and without limitation, autoencoder model 268 may capture only those patterns, frequencies, outliers and the like within a set of ECG signals 224 in order to recreate the set of ECG signals 224. In one or more embodiments, autoencoder model 268 may be used to compare sets of ECG signals 224 wherein ECG signals 224 containing similar patterns, frequencies and the like may indicate some sort of likeness.

With continued reference to FIG. 2, processor 208 may utilize a masked autoencoder technique to train ECG machine learning model 146. A masked autoencoder technique refers to a process in which the input data is modified such that various portions are masked or removed and the autoencoder model 268 may be configured to reconstruct the original input data. In one or more embodiments, a masked autoencoder model may be configured to receive an input such as modified ECG data 252 and be configured to reconstruct ECG data 218 and/or the masked temporal patches 248. In one or more embodiments, masked autoencoder model can be used for denoising and/or anomaly detection. In one or more embodiments, masked autoencoder model may be configured to remove noise from ECG signals 224 wherein reconstructed outputs may include the missing portions of the ECG signals 224 as well as the noise removed. In one or more embodiments, masked autoencoder model can further be trained on normal ECG signals 224 and/or abnormal ECG signals 224 in order to whether an ECG signal 224 may be determined to be normal or abnormal. In one or more embodiments, masked autoencoder model may be configured with finding similarities between multiple ECG signals 224 in order to determine similarities between normal and abnormal ECG signals 224. In one or more embodiments, masked autoencoder model may contain one or more parameter values 260 that are sought to be adjusted during training. In one or more embodiments, the parameter values 260 may be used for other machine learning models in order to find similarities between ECG signals 224. In one or more embodiments, parameter values 260 of masked autoencoder model, such as but not limited to model architecture parameters, training parameters, regularization parameters and the like may be iteratively adjusted in order to minimize discrepancies between reconstructed temporal patches 240 and masked temporal patches 248. In one or more embodiments, masked autoencoder model may be configured to reconstruct masked temporal patches 248 based on inputs such as modified ECG data 252 wherein parameter values 260 may be adjusted based on discrepancies between the reconstructed output and masked temporal patches 248. In one or more embodiments, masked autoencoder model may be trained using backpropagation and gradient descent to minimize the reconstruction error between the output of the decoder and the original unmasked temporal patch 248 within ECG data 218.

With continued reference to FIG. 2, ECG machine learning model 146 may be trained based on the size of masked temporal patches 248. In one or more embodiments, temporal variables may be adjusted such that parameter values 260 of ECG machine learning models 256 may account for temporal patches 240 with small ranges of time and larger ranges of time. For example, and without limitation, a temporal patch 240 may contain a time duration of 10 seconds wherein ECG machine learning model 146 may be configured to recreate a temporal patch 240 having a time duration of 10 second. Similarly, temporal patch 240 may contain a time duration of 10 ms wherein ECG machine learning model 146 may be configured to recreate temporal patches 240 having a time duration of 10 ms. in an embodiment, processor 208 may vary temporal variables in order to capture larger predicted outputs as well as smaller and more accurate outputs.

With continued reference to FIG. 2, pretraining ECG machine learning model 146 may include generating parameter values 260 for ECG machine learning model 146. In one or more embodiments, pre training ECG machine learning model 146 may include iteratively varying temporal variables in order to predict smaller or larger temporal patches 240.

With continued reference to FIG. 2, in one or more embodiments processor 208 may be configured to train ECG machine learning model 146 as a function of the one or more parameter values 260 and a labeled set of ECG training data. in an embodiment, pre training ECG machine learning model 146 may include generating parameter values 260 wherein the parameter values 260 indicate associations between inputs and outputs. in an embodiment, ECG data 218 and/or modified ECG data 252 may be used to generate and/or modify parameter values 260 wherein parameter values 260 may be used to train ECG machine learning model 146.

With continued reference to FIG. 2, ECG machine learning model 146 may be configured to receive inputs such as ECG signals 224, Sets of ECG signals 224 and the like and output information associated with the ECG signals 224. In an embodiment, outputs may include outputs such as cardiac values, irregular heart rhythms, values associated with a particular set of heart conditions and the like.

With continued reference to FIG. 2, processor 208 may be configured to train ECG machine learning model 146 as a function of one or more parameter values 260 and a labeled set of training data. A labeled set of training data" or "labeled training data" as referred to herein refers to training data that has been labeled such that the training data contains inputs and correlated labeled outputs. For example, and without limitation, labeled training data may include inputs such as ECG signals 224 and correlated outputs labeling the ECG signals 224 with various cardiac values, abnormal heart rhythms and the like. In one or more embodiments, labeled training may include inputs such as ECG signals 224 and correlated outputs indicating abnormalities, wave patterns, arrythmia and/or other heart conditions. In one or more embodiments, labeled training data may be generated by a user, $3^{rd}$ party and the like. In one or more embodiments, labeled training data may be received from previous iterations of the processing wherein previously received ECG signals 224 may be given a label through user input in order to increase the amount of labeled training data. In one or more embodiments, labeled training data may be iteratively refined and/or modified in order to ensure that inputs contain correct labels and/or correlated outputs. In one or more embodiments, A set of labeled training data may include labeled training data for a particular purpose associated with heart abnormalities. For example, and without limitation, set of labeled training data may include training data exclusively for classification, training data exclusively for pattern recognition, Training data for predicting previous abnormalities, training data for predicting future abnormalities and the like. In one or more embodiments, labeled set of training data may include an unlabeled set of training data wherein processor 208 may perform a similar process on unlabeled set of training data in order to generate labeled set of training data.

With continued reference to FIG. 1, processor 208 may fine tune a pre trained machine learning model, such as ECG machine leaning model, that has been trained on a large set of unlabeled training data. In one or more embodiments, ECG machine learning model 146 may be pre trained to identify patterns and features within ECG signals 224. In one or more embodiments, processor 208 may feed ECG machine learning model 146 with labeled training data in order to adjust the parameters of ECG machine learning model 146 to generate outputs associated with ECG signals 224. In one or more embodiments, processor 208 may update parameters using one or more back propagation techniques. In one or more embodiments, backpropagation techniques may include a processor 208 feeding error rates through a neural network to make the neural network more accurate. In one or more embodiments, errors between the machine learning models predictions and true labels are used to update the model's weights such as parameter values 260. In one or more embodiments, labeled training data may be used to predict outputs associated with an ECG signal 224 wherein outputs of ECG machine learning model 146 may be compared to the true value of the outputs as indicated by labeled training data. In one or more embodiments, regularization techniques such as dropout of weight decay may be used in order to prevent ECG machine learning model 146 from memorizing the small set of labeled training data. In one or more embodiments, training ECG machine learning model 146 may include fine tuning already generated parameter values 260 for a particular purpose.

In one or more embodiments, processor 208 may use one or more transfer learning processes to train ECG machine learning model 146. In one or more embodiments, fine tuning may include a process in which insights, features, representations and the like generated during a pre-training phase can be used and applied to current machine learning models. For example, and without limitation, representations learned using ECG data 218 may be applied to various machine learning models to generate more accurate outputs. In one or more embodiments, processor 208 may use one or more feature extraction processes to extract high level representations of the data received and use those high level representations as inputs into the new model. In one or more embodiments, transfer learning may allow for learned features to be fine-tuned to a specific task or process. For example, and without limitation, extracted features may include recognizing particular patterns, frequencies and the like wherein said particular patterns and frequencies may be used to identify abnormalities. In one or more embodiments, during transfer learning the new model is initialized from weights, parameter values 260 and the like generated during pre-training. In one or more embodiments, parameter values 260 may then be fine-tuned by introducing a labeled training data set. In one or more embodiments, learned representations may be used to identify abnormalities in ECG signals 224, classify patterns in ECG signals 224 to disease states and the like. In one or more embodiments, pretraining ECG machine learning model 146 may allow for generalization wherein ECG machine learning model 146 may be configured to adapt to new unseen data due to the vast amount of ECG data 218 received. In one or more embodiments, a smaller dataset of Labeled training data may prevent generalization as the machine learning model may not be trained to properly analyze unseen data. In one or more embodiments, pre training ECG machine learning model 146 may allow for generalization. In one or more embodiments, ECG machine learning model 146 may be trained following each iteration of apparatus. In one or more embodiments, a user may iteratively provide feedback in order to train ECG machine learning model 146. In one or more embodiments, ECFG machine learning model may be pretrained using a large data set in order to reduce the training of ECG machine learning model 146. In one or more embodiments, pre training ECG machine learning model 146 may allow for more accurate outputs and as a result, less computational power needed to iteratively train ECG machine learning model 146.

With continued reference to FIG. 2, ECG machine learning model 146 may be configured to receive one or more ECG inputs 272 such as for example ECG input data 118 from a patient and output one or more diagnostic labels 276 associated with the patient, such as for example, cardiac values as described in reference to FIG. 1. In an embodiment, ECG inputs 272 may include ECG signals 224 received from one or more sensors 232 in contact with the patient. As used in the current disclosure, a "diagnostic label" is a label used describe a specific condition, disorder, or illness that affects an individual's health or heart structure or function. In one or more embodiments, diagnostic label may include cardiac values as described above. Diagnostic label 276 may be any specific condition, disorder, or illness, specifically associated with the heart. In a non-limiting example, diagnostic labels 276 may be associated with conditions related to the cardiac health such as normal sinus rhythm, atrial fibrillation, myocardial infarction, ventricular tachycardia, bundle branch bloc, arrythmias, ischemic heart disease, heart enlargement, conduction abnormalities, cardiac ischemia, electrolyte imbalances, and the like. In one or more embodiments, ECG machine learning model may already be assigned to a particular heart condition, wherein diagnostic label may include a value associated with the severity of the condition. In one or more embodiments, diagnostic labels may include cardia values wherein cardia values may indicate an ejection fraction level, a probability that the patient has a particular heart condition and the like. In one or more embodiments. ECG training data may contain a plurality of ECG inputs 272 and corelated diagnostic labels 276. In one or more embodiments, labeled training data as described in reference to FIG. 1 may include ECG training data. In an embodiment, ECG training data may be generated by a user, $3^{rd}$ party or the like. In one or more embodiments, ECG training data may be received from electronic health records containing ECG inputs 272 and correlated diagnostic labels 276.

With continued reference to FIG. 2, ECG inputs 272 may include images of ECG signals 224. In one or more embodiments, processor 208 may be configured to perform image classification using an image classifier wherein processor 208 may be configured to detect various features of ECG inputs 272 and assign diagnostic labels 276 based on the various features. An "image classifier," as used in this disclosure is a machine-learning model, such as a mathematical model, neural net, or program generated by a machine-learning algorithm known as a "classification algorithm," as described in further detail below, that sorts inputs of image information into categories or bins of data, outputting the categories or bins of data and/or labels associated therewith. Image classifier may be configured to output at least a datum that labels or otherwise identifies a set of images that are clustered together, found to be close under a distance metric as described below, or the like. Computing device 204 and/or another device may generate image classifier using a classification algorithm, defined as a process whereby computing device 204 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. In some cases, processor 208 may use an image classifier to identify a key image in data described in any data described in this disclosure. As used herein, a "key image" is an element of visual data used to identify and/or match elements to each other. An image classifier may be trained with binarized visual data that has already been classified to determine key images in any other data described in this disclosure. "Binarized visual data" for the purposes of this disclosure is visual data that is described in binary format. For example, binarized visual data of a photo may be comprised of ones and zeroes wherein the specific sequence of ones and zeros may be used to represent the photo. Binarized visual data may be used for image recognition wherein a specific sequence of ones and zeroes may indicate a product present in the image. An image classifier may be consistent with any classifier as discussed herein. An image classifier may receive input data (e.g. ECG inputs 272 and/or images of ECG signals 224) described in this disclosure and output a key image with the data. In an embodiment, image classifier may be used to compare visual data in data such as ECG inputs 272 with visual data in another data set. Visual data in another data set may include a plurality of visual data retrieved from database 216. In some cases, image classifier may identify one or more components within ECG input. In some cases, image classifier may classify various vector loops, various cardiac vectors, and the like within ECG input. In one or more embodiments, a particular vector loop, cardiac vector and the like within cardiac image may be associated with a particular diagnostic label 276.

With continued reference to FIG. 2, processor 208 may employ pattern matching techniques to identify specific patterns or abnormalities within the ECG input to generate diagnostic label 276. This can involve comparing specific segments, intervals, or waveforms of the ECG input to detect similarities or differences. Cross-correlation, template matching, or dynamic time warping algorithms may be used for this purpose. Processor 208 may perform statistical analysis on various parameters derived from the ECG input to generate diagnostic label 276. This can involve calculating means, standard deviations, or other statistical measures for specific features or segments of the ECG input. By comparing these statistical parameters, the computer can identify significant differences or similarities between the ECG input and a reference image. In one or more embodiments, ECG machine learning model 146 may include a machine learning model configured to receive images as inputs and output diagnostic labels 276. In one or more embodiments, ECG machine learning model 146 may be trained using ECG data 218 in textual format.

With continued reference to FIG. 2, ECG machine learning model 146 may be configured to generate cardiac values. In one or more embodiments, system 100 may contain a plurality of ECG machine learning models 256 wherein each ECG machine learning model 146 may be associated with a differing cardiac panel. In one or more embodiments, plurality of ECG machine learning models may be pretrained using similar data, however trained using differing data. In one or more embodiments, ECG training data may differ for each cardiac panel wherein ECG training data may contain inputs correlated to a particular cardiac value. In one or more embodiments, a plurality of ECG training data and/or labeled training data may exist wherein each set of ECG training data may be configured to address a particular cardiac value. For example, and without limitation, a first set of ECG training data may be used to train a machine learning model to determine ejection fraction levels of a patient, whereas a second set of ECG training data may be used to train a machine learning model to receive ECG signals and output levels and/or values associated with Arrythmia. In one or more embodiments, each ECG machine learning model may be trained to address a particular cardiac value. In one or more embodiments, ECG machine learning model may be pre-trained wherein a plurality of differing ECG training data may be used to train each ECG machine learning model for a differing purpose.

Figure 3A:
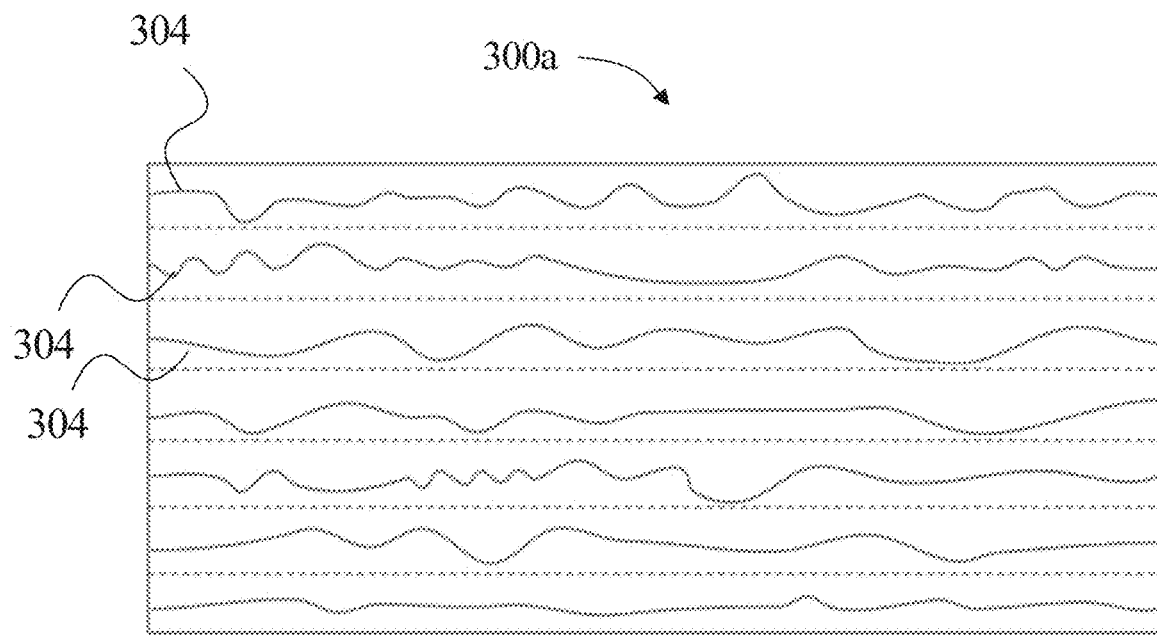
FIGS. 3A-B illustrate a schematic of electrocardiogram signals in accordance with the subject disclosure.

Referring now to FIG. 3A, an exemplary embodiments of a schematic 300a of ECG signals is described. In one or more embodiments, schematic 300a may include a graphical representation of ECG signals 304 as described above. In one or more embodiments, graphical representation may include voltage signals over a given period of time. In one or more embodiments, Schematic may depict ECG signals 304 graphed over a particular period of time. In one or more embodiments, multiple ECG signals 304 may be depicted within a single schematic wherein the amount of ECG signals 304 within the schematic may be referred to as 'N' as described above in reference to FIG. 1. In one or more embodiments, schematic 300a may depict a graphical representation of ECG data (as described in reference to FIG. 1).

Figure 3B:
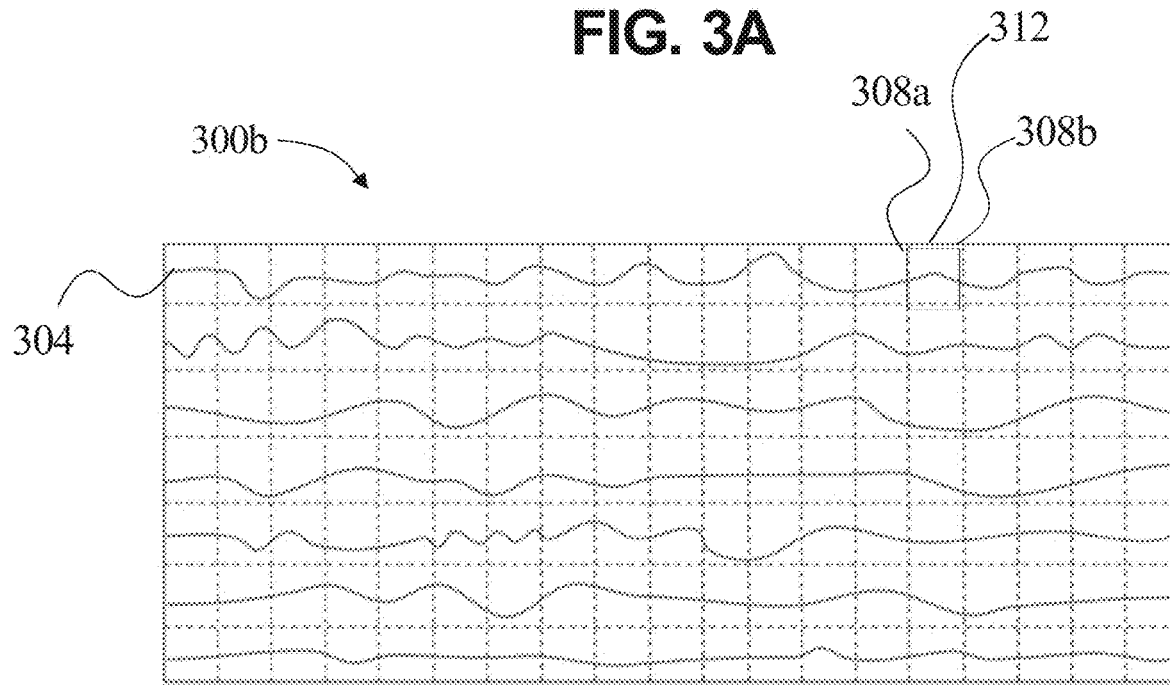

Referring now to FIG. 3B, an exemplary embodiment of a schematic 300b of ECG signals is described. In one or more embodiments, ECG signals may be divided into temporal patches 312 (as described above) wherein a temporal patch 312 may refer to ECG signals from a first boundary 308a to a second boundary 308b. In one or more embodiments, each set of ECG signals 304 may be divided into evenly distributed temporal patches 312 wherein each temporal patch 312 may include ECG signals from a first boundary 308a to a second boundary 308b. In one or more embodiments, ECG signals 308 may be divided into multiple boundaries wherein ECG signals between each boundary may be referred to as temporal patches 312 as described above. In one or embodiments, ECG signals from differing leads within the same boundaries may be referred to as overlapping temporal patches 312. For example, and without limitation, a first ECG signal between first boundary 308a and second boundary 308b, and a second ECG signal between first boundary and second boundary 308b may be referred to as overlapping temporal patches 312. In one or more embodiments, overlapping temporal patches 312 may include ECG signals received from different leads located on an individual's body with similar time frames as indicated by their boundaries. For example, and without limitation, overlapping ECG signals may include ECG signals received from a Lead I and Lead III from a range of 10 ms to 30 ms. In one or more embodiments, the distance between boundaries 308a-b may be referred to as temporal patches 312 wherein each ECG signal may contain multiple consecutive temporal patches 312. In one or more embodiments, boundaries may be created as function of time, wherein a processor may denote to create boundaries at 10 ms intervals such that a first boundary is created at 10 ms, a second boundary is created at 30 ms, a third boundary at 30 ms and the like. In one or more embodiments, temporal patches 312 may be defined as the time frame between a particular pair of boundaries for each ECG signal 304.

Figure 4A:
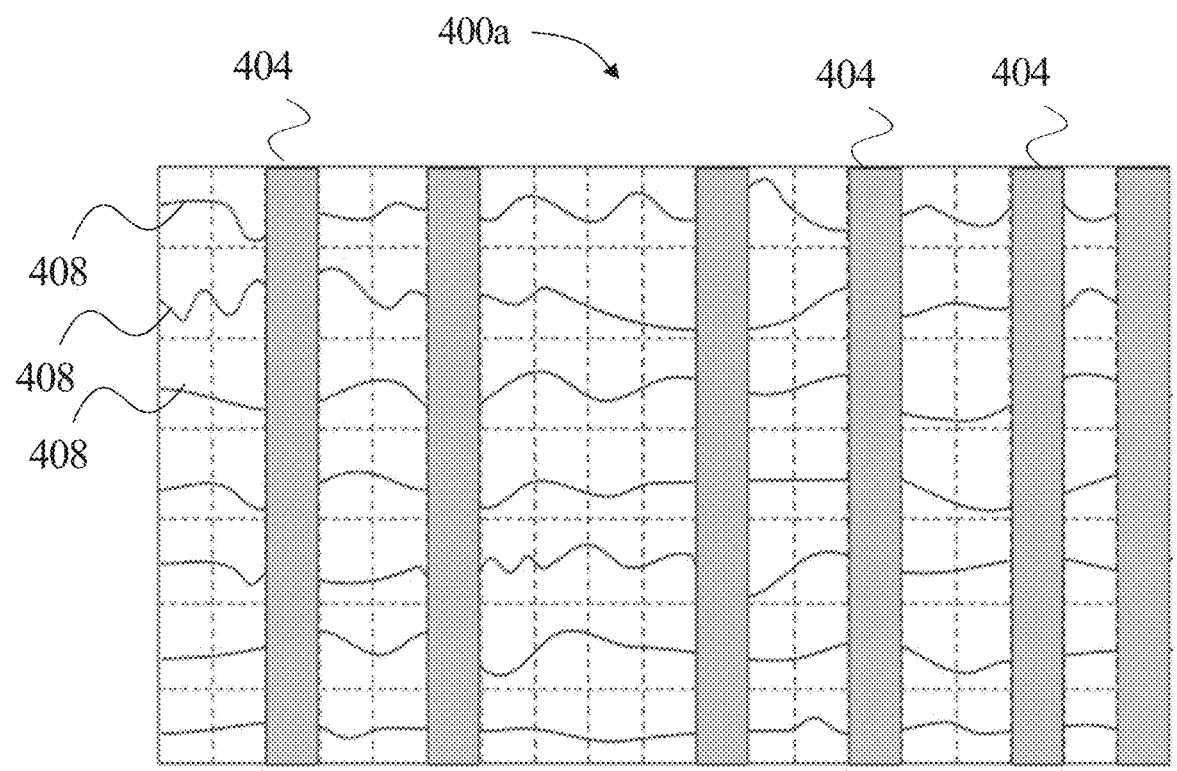
FIG. 4A illustrated a schematic of the electrocardiogram signals with missing portions in accordance with the subject disclosure.

Referring now to FIG. 4A, a schematic 400a of ECG signals with missing portions is described. In one or more embodiments, pre training a machine learning model, such as ECG machine learning model as described above may include the removal of overlapping temporal patches 404a from a set of ECG signals 408. In one or more embodiments, a processor of pretraining may include the creation of boundaries and/or temporal patches as described in reference to FIGS. 3A-3B. In one or more embodiments, pre training ECG machine learning model may include masking overlapping temporal patches 404. In one or more embodiments, overlapping temporal patches may include ECG signals from differing leads that are captured over similar time frames. In one or more embodiments, multiple sets of overlapping temporal patches may exist wherein each set of overlapping temporal patches may correspond to ECG signals 408 received from each lead having similar time frames. For example, and without limitation, a first set of overlapping temporal patches may include ECG signals ranging from 10 ms to 20 ms from 8 differing leads, and a second set of overlapping temporal patches may include ECG signals ranging from 10 ms to 20 ms. In one or more embodiments, each set of overlapping temporal patches may include a single temporal patch from each lead or sensor. In one or more embodiments, pre training ECG machine learning model may include masking entire sets of overlapping temporal patches and/or masking or hiding individual temporal patches within each set of temporal patches. As shown in FIG. 4A for illustrative purposes, multiple set of overlapping temporal patches have been masked. In one or more embodiments, schematic 400a may refer to modified ECG data as described above.

Figure 4B:
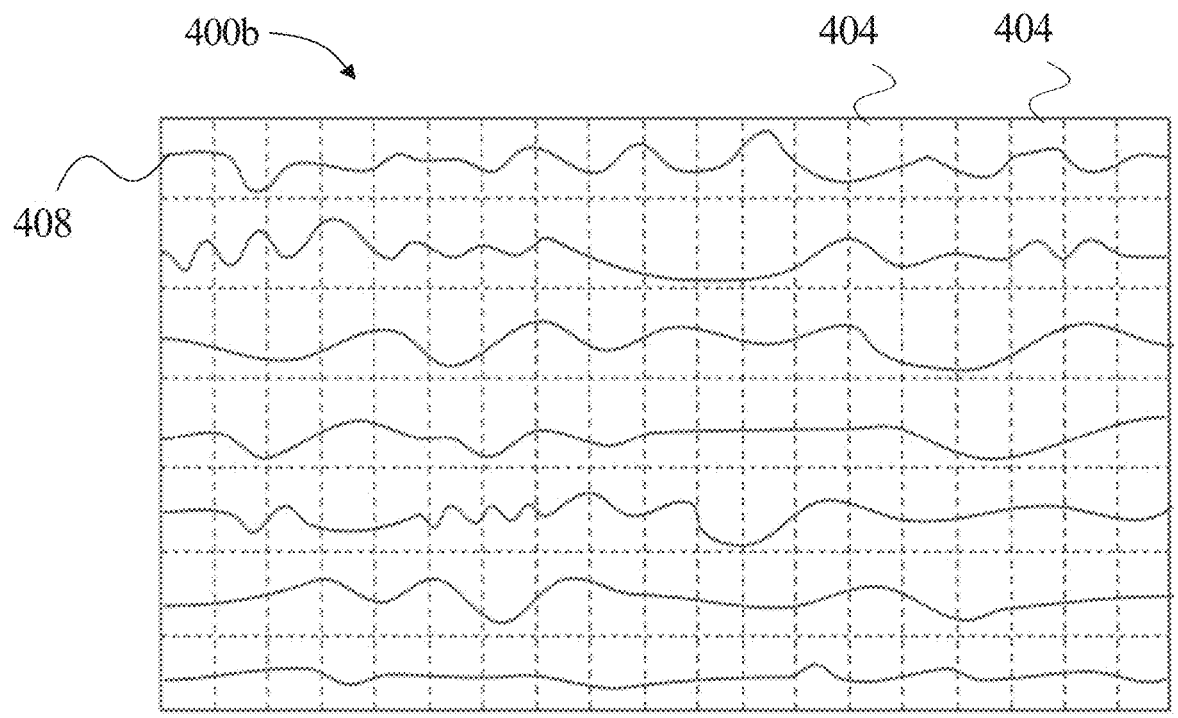
FIG. 4B is a reconstructed schematic of the electrocardiogram signals in accordance with the subject disclosure.

Referring now to FIG. 4B, a reconstructed schematic 400b is described. In one or more embodiments, reconstructed schematic 400a may include predicted outputs of a vision transformer neural network, an autoencoder model and the like. In one or more embodiments, a vision transformer neural network and/or autoencoder model may receive data as depicted in schematic 400a in order to recreate reconstructed schematic 400b. In one or more embodiments, reconstructed schematic 400b may include predicted outputs of one or more machine learning models as described. In one or more embodiments, elements of ECG signals may be masked as depicted in FIG. 4A, wherein a machine learning model may be configured to predict outputs in order to generate ECG signals similar to that of FIGS. 3A-3B. In one or more embodiments, pretraining the machine learning model may include comparing reconstructed schematic 400b to schematic 300a. In one or more embodiments, parameter values of the machine learning model may be adjusted until ECG signals within schematic 400b are similar to that of schematic 200a. In one or more embodiments, a graphical representation of ECG signals 400a as shown in FIGS. 1-2 may be created in order to train a visual transformer neural network. In one or more embodiments, ECG signals may be transformed into an image-like structure prior to utilizing vision transformer neural network in order to train the machine learning model to process images. In an embodiments, training data containing images may require vast amount of data storage and increased computational power while the use of ECG data to generate image like structures may require less computation power and may increase the accuracy of output. In one or more embodiments overlapping temporal patches 404 may be reconstructed and/or predicted as illustrated in FIG. 4B.

Figure 5:
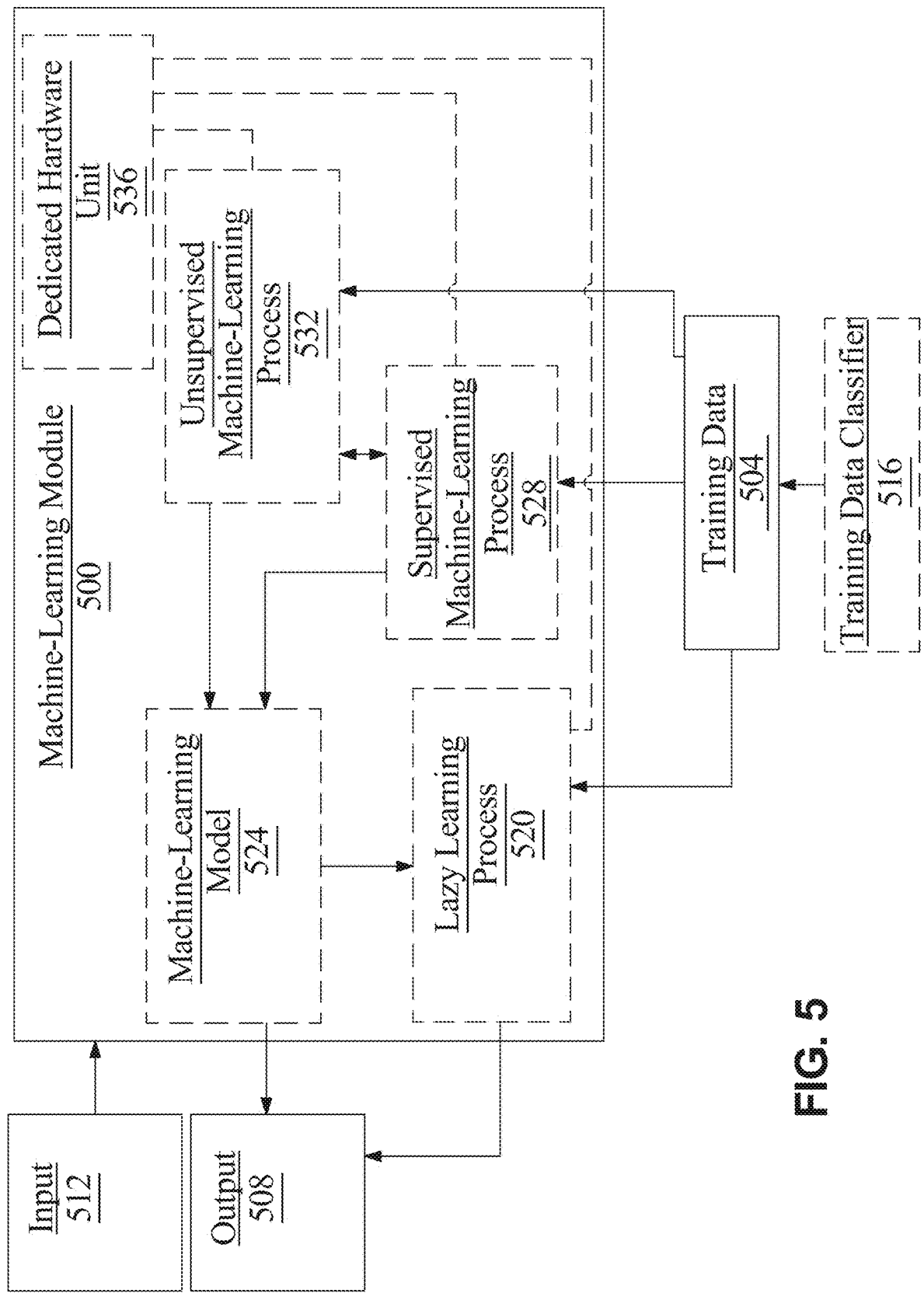
FIG. 5 is a block diagram of an exemplary machine-learning process.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example inputs may include inputs such as ECG data, modified ECG data, and/or ECG inputs, wherein outputs may include masked temporal patches, parameter values and/or diagnostic labels.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to particular leads that receive ECG data. for example, and without limitation ECG signals may be classified to the lead in which they were received.

Still referring to FIG. 5, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 5, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 5, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 5, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 5, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs may include inputs such as ECG data, modified ECG data, and/or ECG inputs, wherein outputs may include masked temporal patches, parameter values and/or diagnostic labels as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
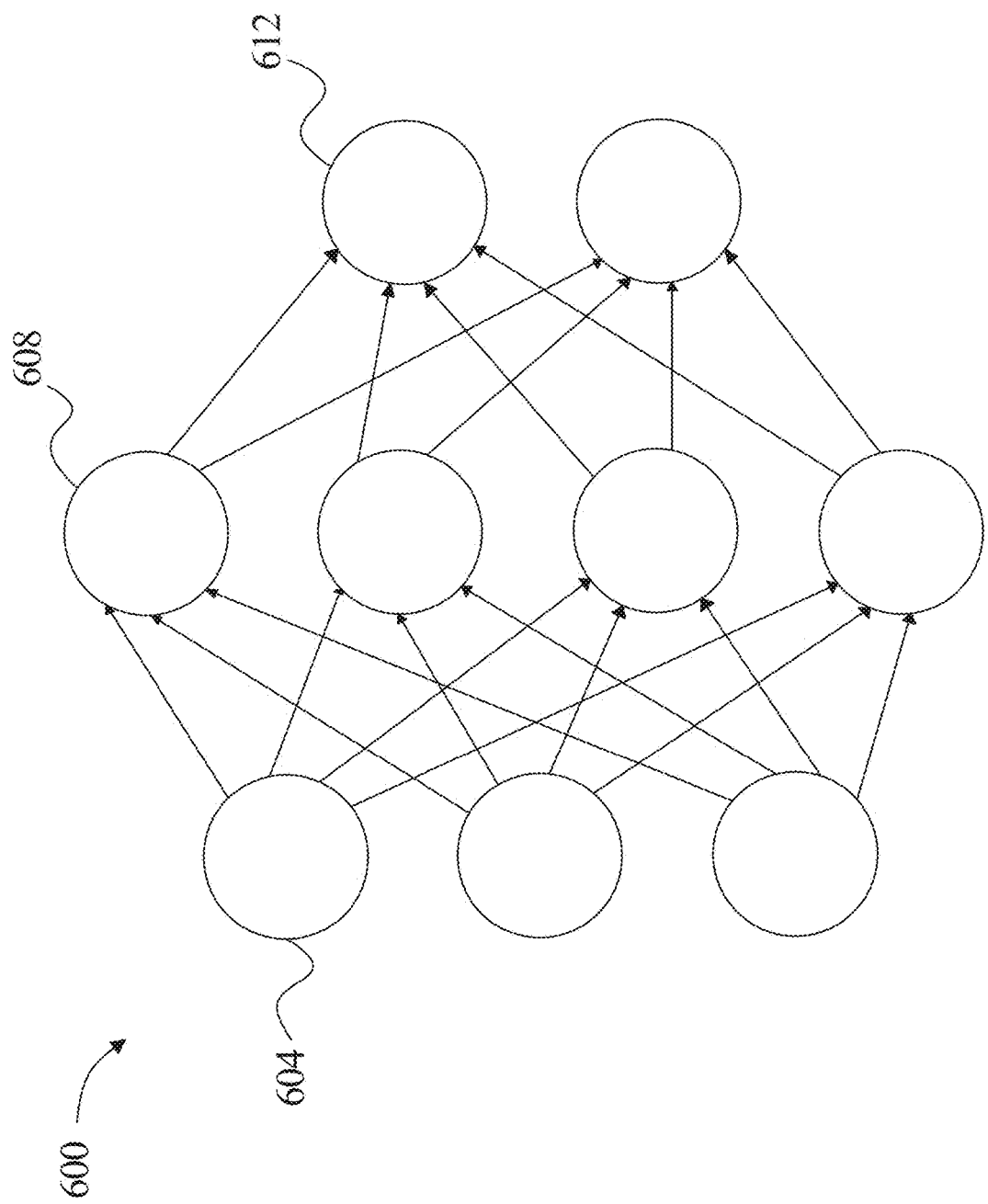
FIG. 6 is a diagram of an exemplary embodiment of a neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
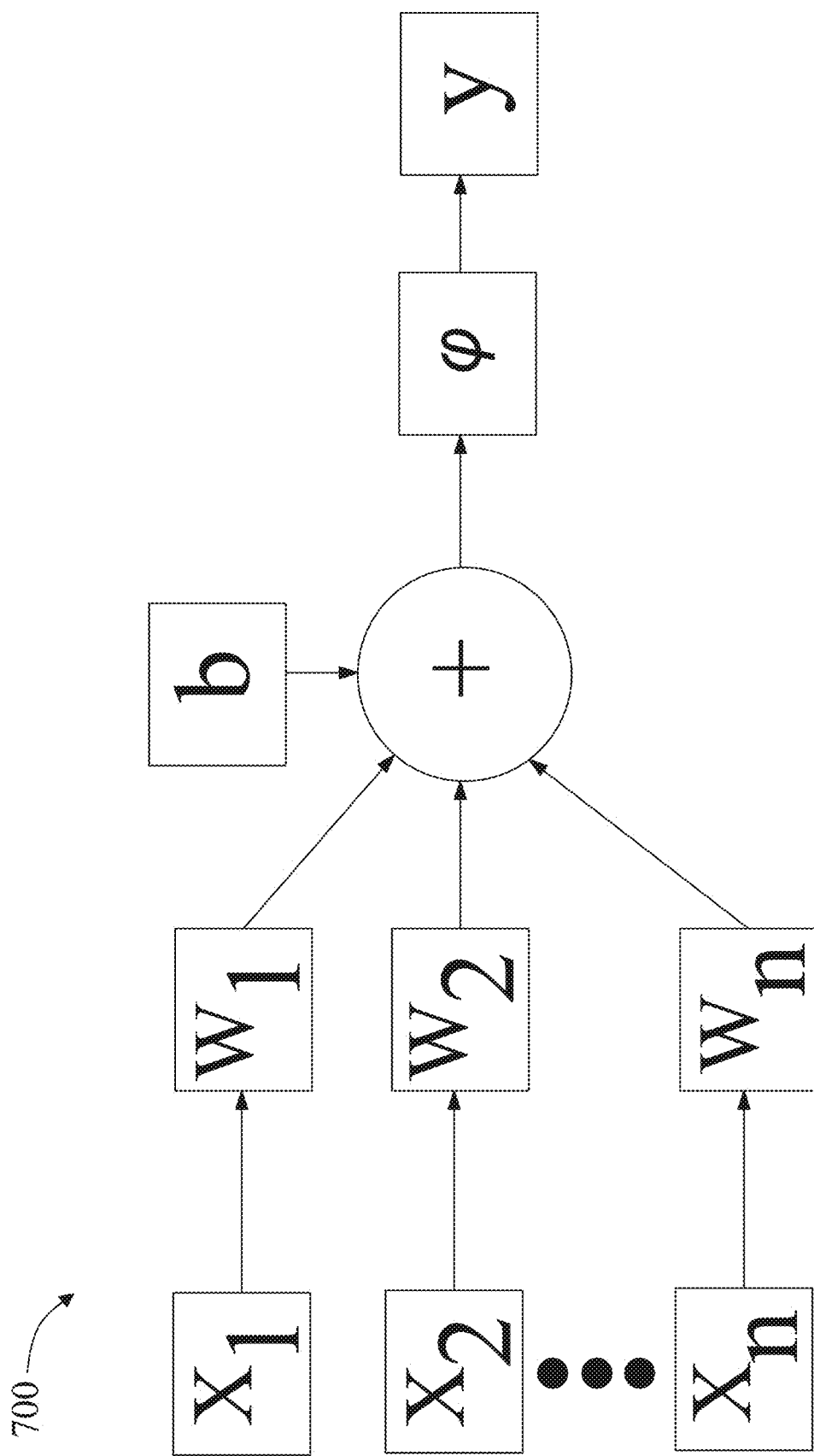
FIG. 7 is a diagram of an exemplary embodiment of a node of a neural network.

Referring now to FIG. 7, an exemplary embodiment of a node 700 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as f(x)=a(1+tan h($\sqrt{2/\pi}$(x+bx$^r$))) for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
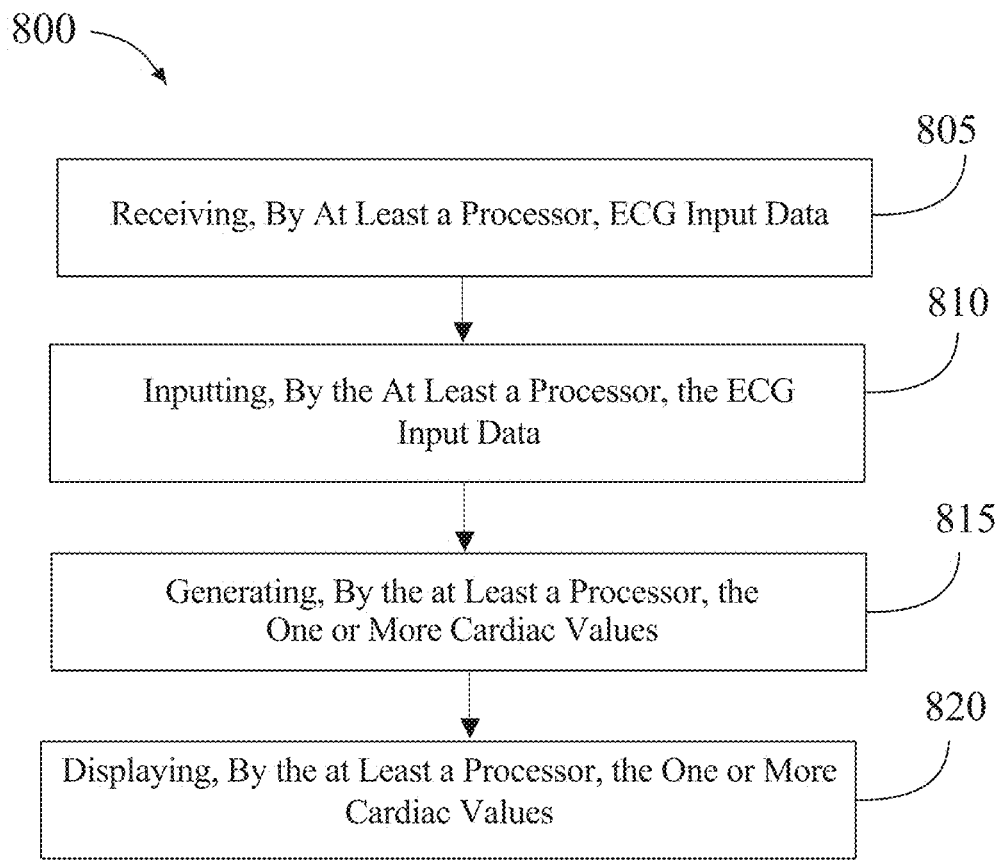
FIG. 8 is a flow diagram illustrating an exemplary embodiment of a method for tracking cardiac values.

Referring now to FIG. 8, an exemplary method 800 for tracking cardiac values is described. At step 805, method 800 includes receiving, by at least a processor, electrocardiogram (ECG) input data from a patient including a plurality of ECG signals. In one or more embodiments, ECG input data includes a matrix having one or more leads and one or more voltage signals associated with the one or more leads. This may be implemented with reference to FIGS. 1-8 and without limitation.

With continued reference to FIG. 8, at step 810, method 800 includes inputting, by the at least a processor, the ECG input data into one or more cardiac panels, wherein each cardiac panel of the one or more cardiac panel is configured to address a cardiac value and each cardiac panel comprises an ECG machine learning model configured to receive ECG input data as inputs and output cardiac values. In one or more embodiments, at least one of the one or more cardiac values includes a cardiac deviation and wherein the cardiac deviation includes a change in the at least one cardiac value. In one or more embodiments, inputting, by the at least a processor, the ECG input data into the or more cardiac panels includes selecting the one or more cardiac panels from a plurality of cardiac panels as a function of a user input. In one or more embodiments, at least one of the one or more cardiac values includes an ejection fraction level of the patient. This may be implemented with reference to FIGS. 1-8 and without limitation.

With continued reference to FIG. 8, at step 815 method 800 includes generating, by the at least a processor, the one or more cardiac values from each cardiac panel as a function of the ECG input data and the one or more ECG machine learning models. In one or more embodiments, at least one cardiac value may include a probability of the patient satisfying at least one ejection fraction level threshold. In one or more embodiments, training the one or more ECG machine learning models includes receiving a plurality of ECG data associated with a plurality of patients, pretraining the ECG machine learning model as a function of the plurality of ECG data by adjusting one or more parameter values of the ECG machine learning model and training each ECG machine learning model as a function of the parameter values and a labeled set of training data. In one or more embodiments, the plurality of ECG data includes unlabeled training data. In one or more embodiments, each ECG machine learning model of the one or more ECG machine learning models are trained with a differing sets of labeled of training data. In one or more embodiments, generating, by the at least a processor, the one or more cardiac values from the one or more cardiac panels as a function of the ECG input data and the one or more ECG machine learning models includes generating, using a first ECG machine learning model of a first cardiac panel of the one or more cardiac panels, a first cardiac value having a probability of the patient satisfying a first ejection fraction level threshold and generating, using a second ECG machine learning model of the first cardiac panel of the one or more cardiac panels, a second cardiac value having a probability of the patient satisfying a second ejection fraction level threshold. In one or more embodiments, generating, by the at least a processor, the one or more cardiac values from the one or more cardiac panels as a function of the ECG input data and the one or more ECG machine learning models includes generating, using a first ECG machine learning model of a first cardiac panel of the one or more cardiac panels, a first cardiac value comprising a probability of the patient satisfying a first ejection fraction level threshold and generating, using a second ECG machine learning model of the first cardiac panel of the one or more cardiac panels, a second cardiac value comprising a probability of the patient satisfying a second ejection fraction level threshold. This may be implemented with reference to FIGS. 1-8 and without limitation.

With continued reference to FIG. 8, method 800 may include a step 820 of displaying, by the at least a processor, the one or more cardiac values through a graphical user interface. In one or more embodiments, displaying, by the at least a processor, the one or more cardiac values through the graphical user interface includes generating a graphical visualization for each of the one or more cardiac values. In one or more embodiments, displaying by the at least a processor, the one or more cardiac values includes comparing the one or more cardiac values to one or more cardiac baselines and displaying the one or more cardiac values as a function of the one or more cardiac baselines. This may be implemented with reference to FIGS. 1-8 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
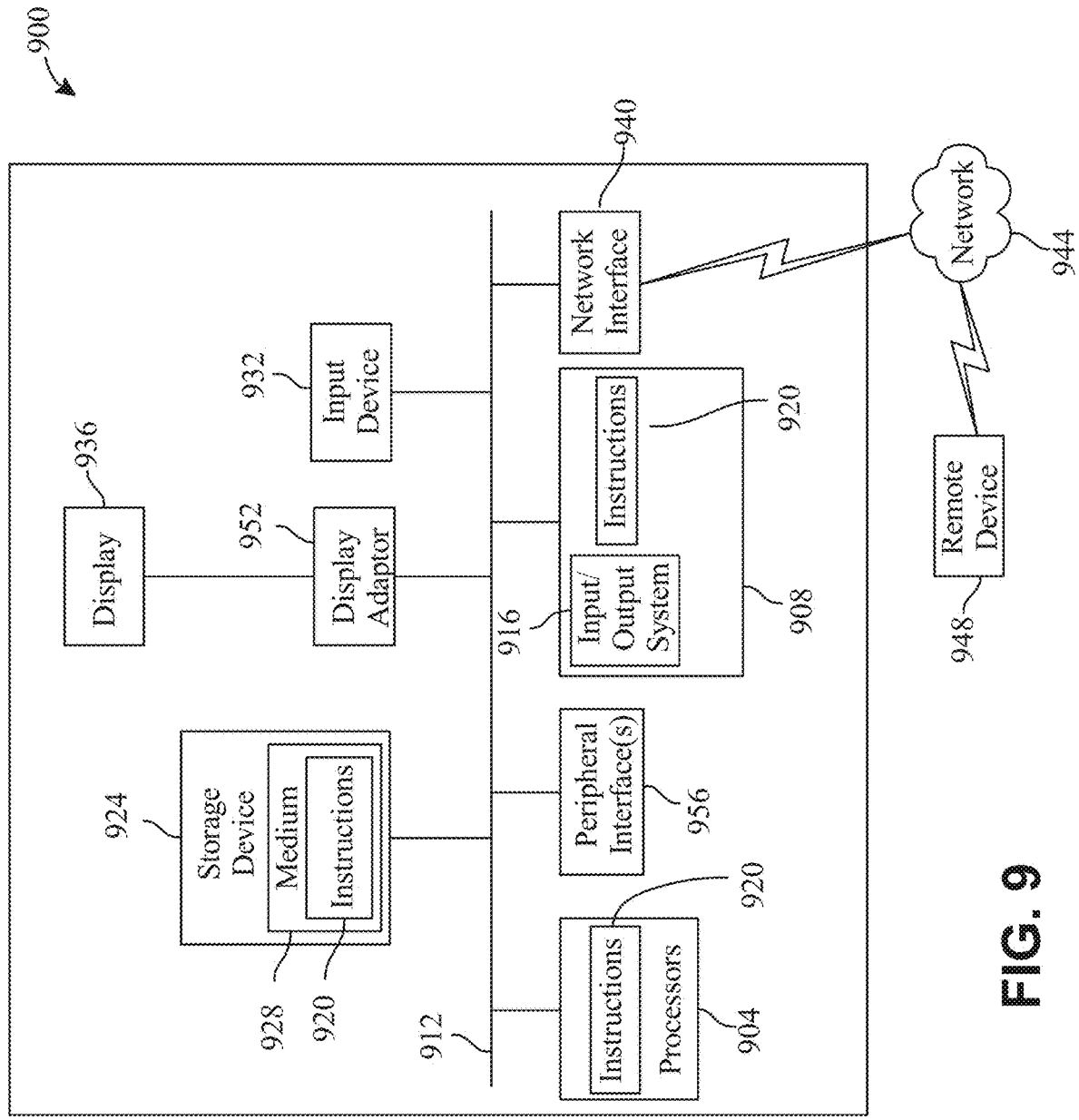
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for tracking cardiac values, the system comprising:
   at least a processor; and
   a memory communicatively connected to the at least a processor, wherein the memory contains instructions configuring the at least a processor to:
   receive electrocardiogram (ECG) input data associated with a patient, wherein the ECG input data comprises a plurality of ECG signals;
   input the ECG input data into one or more cardiac panels, wherein:
      inputting the ECG input data into the or more cardiac panels comprises selecting the one or more cardiac panels from a plurality of cardiac panels as a function of a user input received from a remote device;
      each cardiac panel of the one or more cardiac panels is configured to calculate a cardiac value associated with a heart condition;
      each cardiac panel comprises at least one ECG machine learning model configured to receive ECG input data as inputs and output cardiac values, wherein the at least one ECG machine learning model is pretrained, and wherein pretraining the at least one ECG machine learning model comprises iteratively adjusting parameter values of the at least one ECG machine learning model to identify features in the ECG input data; and
      each cardiac panel contains a distinct set of algorithms configured to singularly predict a particular cardiac disease associated with the patient thereby using a same input of the ECG input data to output a differing cardiac disease, the plurality of cardiac panels comprising:
         a first cardiac panel containing a first algorithm configured to determine a first cardiac value and predict a first cardiac disease associated with the patient; and
         a second cardiac panel containing a second algorithm configured to determine a second cardiac value and predict a second cardiac disease associated with the patient, wherein the second algorithm is distinct from the first algorithm and the second cardiac disease is distinct from the first cardiac disease; and
   generate the one or more cardiac values from the one or more cardiac panels as a function of the ECG input data and the at least one ECG machine learning model, wherein at least one cardiac value of the one or more cardiac values generated by the at least one ECG machine learning model comprises a probability of the patient satisfying at least one ejection fraction level threshold of the patient.

2. The system of claim 1, wherein pretraining the at least one ECG machine learning model comprises:
   receiving a plurality of ECG data associated with a plurality of patients;
   pretraining the at least one ECG machine learning model in each cardiac panel of the one or more cardiac panels as a function of the plurality of ECG data by adjusting one or more parameter values of the at least one ECG machine learning model; and
   training the at least one ECG machine learning model as a function of the parameter values and a labeled set of training data.

3. The system of claim 2, wherein each ECG machine learning model of the at least one ECG machine learning model is trained with a differing set of labeled training data.

4. The system of claim 1, wherein generating the one or more cardiac values from the one or more cardiac panels as a function of the ECG input data and the at least one ECG machine learning model comprises:

generating, using a first ECG machine learning model of a first cardiac panel of the one or more cardiac panels, a first cardiac value comprising a probability of the patient satisfying a first ejection fraction level threshold; and generating, using a second ECG machine learning model of the first cardiac panel of the one or more cardiac panels, a second cardiac value comprising a probability of the patient satisfying a second ejection fraction level threshold.

5. The system of claim 1, wherein at least one of the one or more cardiac values comprises a cardiac deviation and wherein the cardiac deviation comprises a change in the at least one cardiac value.

6. The system of claim 1, wherein the memory contains instructions further configuring the at least a processor to display the one or more cardiac values through a graphical user interface, wherein displaying the one or more cardiac values through the graphical user interface comprises generating a graphical visualization for each of the one or more cardiac values.

7. The system of claim 1, wherein the memory contains instructions further configuring the at least a processor to display the one or more cardiac values through a graphical user interface, wherein displaying the one or more cardiac values through the graphical user interface comprises:

comparing the one or more cardiac values to one or more cardiac baselines; and displaying the one or more cardiac values as a function of the comparison.

8. The system of claim 1, wherein the ECG input data comprises a matrix comprising one or more leads and one or more voltage signals associated with the one or more leads.

9. The system of claim 1, wherein the ejection fraction level comprises a percentage of blood flow through a ventricle of the patient's heart.

10. A method for tracking cardiac values, the method comprising:

receiving, by at least a processor, electrocardiogram (ECG) input data associated with a patient wherein the ECG input data comprises a plurality of ECG signals;

inputting, by the at least a processor, the ECG input data into one or more cardiac panels, wherein:

inputting the ECG input data into the or more cardiac panels comprises selecting the one or more cardiac panels from a plurality of cardiac panels as a function of a user input received from a remote device;

each cardiac panel of the one or more cardiac panels is configured to calculate a cardiac value associated with a heart condition;

each cardiac panel comprises at least one ECG machine learning model configured to receive ECG input data as inputs and output cardiac values, wherein the at least one ECG machine learning model is pretrained, and wherein pretraining the at least one ECG machine learning model comprises iteratively adjusting parameter values of the at least one ECG machine learning model to identify features in the ECG input data; and each cardiac panel contains a distinct set of algorithms configured to singularly predict a particular cardiac disease associated with the patient thereby using a same input of the ECG input data to output a differing cardiac disease, the plurality of cardiac panels comprising:

a first cardiac panel containing a first algorithm configured to determine a first cardiac value and predict a first cardiac disease associated with the patient; and a second cardiac panel containing a second algorithm configured to determine a second cardiac value and predict a second cardiac disease associated with the patient, wherein the second algorithm is distinct from the first algorithm and the second cardiac disease is distinct from the first cardiac disease; and generating, by the at least a processor, the one or more cardiac values from the one or more cardiac panels as a function of the ECG input data and the at least one ECG machine learning model, wherein at least one cardiac value of the one or more cardiac values generated by the at least one ECG machine learning model comprises a probability of the patient satisfying at least one ejection fraction level threshold.

11. The method of claim 10, wherein pretraining the at least one ECG machine learning model comprises:

receiving a plurality of ECG data associated with a plurality of patients;

pretraining the at least one ECG machine learning model in each cardiac panel of the one or more cardiac panels as a function of the plurality of ECG data by adjusting one or more parameter values of the at least one ECG machine learning model; and training the least one ECG machine learning model as a function of the parameter values and a labeled set of training data.

12. The method of claim 11, wherein each ECG machine learning model of the at least one ECG machine learning model is trained with a differing set of labeled training data.

13. The method of claim 10, wherein generating, by the at least a processor, the one or more cardiac values from the one or more cardiac panels as a function of the ECG input data and the at least one ECG machine learning model comprises:

generating, using a first ECG machine learning model of a first cardiac panel of the one or more cardiac panels, a first cardiac value comprising a probability of the patient satisfying a first ejection fraction level threshold; and generating, using a second ECG machine learning model of the first cardiac panel of the one or more cardiac panels, a second cardiac value comprising a probability of the patient satisfying a second ejection fraction level threshold.

14. The method of claim 10, wherein at least one of the one or more cardiac values comprises a cardiac deviation and wherein the cardiac deviation comprises a change in the at least one cardiac value.

15. The method of claim 10, further comprising displaying, by the at least a processor, the one or more cardiac values through a graphical user interface, wherein displaying the one or more cardiac values through the graphical user interface comprises generating a graphical visualization for each of the one or more cardiac values.

16. The method of claim 10, further comprising displaying, by the at least a processor, the one or more cardiac values through a graphical user interface, wherein displaying the one or more cardiac values through the graphical user interface comprises:

comparing the one or more cardiac values to one or more cardiac baselines; and displaying the one or more cardiac values as a function of the comparison.

17. The method of claim 10, wherein the ECG input data comprises a matrix comprising one or more leads and one or more voltage signals associated with the one or more leads.

18. The method of claim 10, wherein the ejection fraction level comprises a percentage of blood flow through a ventricle of the patient's heart.

* * * * *